United States Patent
Johnson et al.

(10) Patent No.: US 7,996,441 B2
(45) Date of Patent: *Aug. 9, 2011

(54) ENTERPRISE PROPOSAL MANAGEMENT SYSTEM

(75) Inventors: Christopher Johnson, Vienna, VA (US); Michael Branson, Herndon, VA (US)

(73) Assignee: i3solutions, Sterling, VA (US)

( * ) Notice: Subject to any disclaimer, the term of this patent is extended or adjusted under 35 U.S.C. 154(b) by 111 days.

This patent is subject to a terminal disclaimer.

(21) Appl. No.: 12/366,255

(22) Filed: Feb. 5, 2009

(65) Prior Publication Data
US 2009/0171726 A1    Jul. 2, 2009

Related U.S. Application Data

(63) Continuation of application No. 11/590,755, filed on Nov. 1, 2006, now Pat. No. 7,506,001.

(51) Int. Cl.
*G06F 7/06* (2006.01)
*G06F 17/30* (2006.01)
*G06Q 10/00* (2006.01)

(52) U.S. Cl. ......... 707/804; 707/803; 707/608; 705/1.1; 705/7.12

(58) Field of Classification Search ............... 707/104.1, 707/999.104, 608, 899, 803, 804, 102, 999.107, 707/999.102; 705/7, 1, 7.12
See application file for complete search history.

(56) References Cited

U.S. PATENT DOCUMENTS

| | | | |
|---|---|---|---|
| 6,049,776 A | 4/2000 | Donnelly et al. | 705/8 |
| 6,158,044 A | 12/2000 | Tibbetts | 717/1 |
| 6,678,671 B1 | 1/2004 | Petrovic et al. | 707/1 |
| 7,003,473 B2 | 2/2006 | Curtis et al. | 705/7 |
| 7,089,203 B1 | 8/2006 | Crookshanks | 705/37 |
| 7,506,001 B2 | 3/2009 | Johnson et al. | 707/104.1 |
| 2001/0037213 A1 | 11/2001 | Kinoshita | 705/1 |
| 2003/0182212 A1 | 9/2003 | Moscone et al. | 705/30 |
| 2003/0200168 A1 | 10/2003 | Cullen, III et al. | 705/37 |
| 2006/0074839 A1 | 4/2006 | Pursche et al. | 707/1 |
| 2006/0143270 A1 | 6/2006 | Wodtke et al. | 709/206 |
| 2006/0190391 A1 | 8/2006 | Cullen, III et al. | 705/37 |

(Continued)

OTHER PUBLICATIONS

PCT Notification of Transmittal of the International Search Report and the Written Opinion of the International Searching Authority, or the Declaration, mailed May 14, 2008, in re PCT/US07/11535 filed May 14, 2007 (6 pages).

*Primary Examiner* — James Trujillo
*Assistant Examiner* — Bruce M Moser
(74) *Attorney, Agent, or Firm* — Pillsbury Winthrop Shaw Pittman LLP

(57) ABSTRACT

A system and method for managing an enterprise is provided. The system and method may be based on a layered architecture including a data center that may store all documents and data abstractions for an enterprise. One or more services may interact with an enterprise resource planning system and/or a customer relationship manager to facilitate interaction with the documents and data abstractions. A client access point of the system may include a graphical user interface that includes one or more enterprise management functions for managing the enterprise documents and/or data abstractions. The enterprise management functions may include a user proposal manager, an enterprise proposal manager, a proposal library, a content health manager, an archive library, a bid center, a contracts manager, a resume manager, a debriefing center and/or a projects manager. The enterprise management functions man re-engineer business processes and enable users to manage all aspects of an enterprise using a single unified interface.

30 Claims, 14 Drawing Sheets

U.S. PATENT DOCUMENTS

| | | | |
|---|---|---|---|
| 2006/0282380 A1 | 12/2006 | Birney et al. | 705/42 |
| 2007/0016514 A1* | 1/2007 | Al-Abdulqader et al. | 705/37 |
| 2007/0033093 A1 | 2/2007 | Divine et al. | 705/10 |
| 2008/0015880 A1* | 1/2008 | Freedenberg et al. | 705/1 |
| 2008/0059208 A1* | 3/2008 | Rockfeller et al. | 705/1 |
| 2008/0255918 A1* | 10/2008 | Madhavan | 705/9 |
| 2008/0288285 A1* | 11/2008 | Mancini et al. | 705/2 |

* cited by examiner

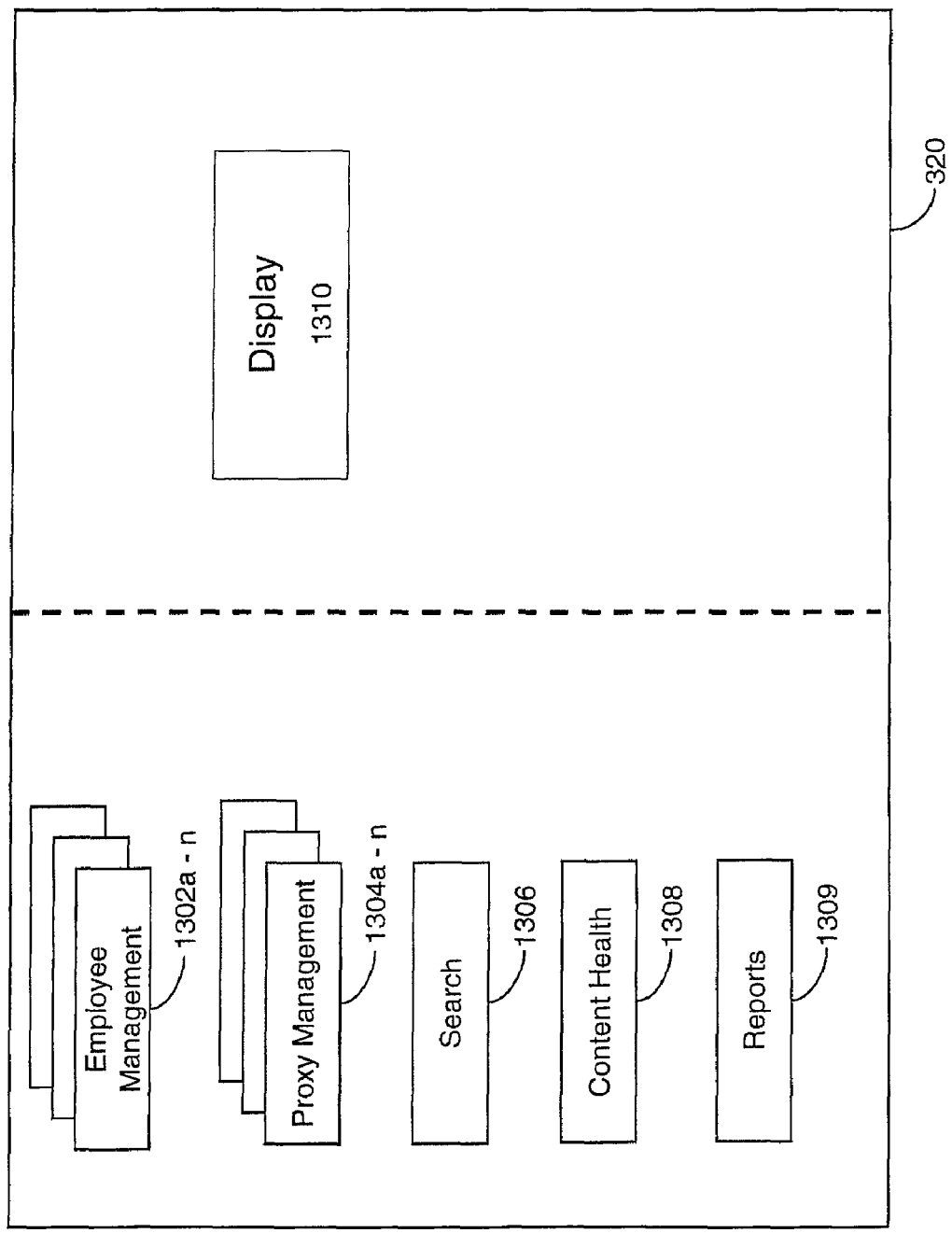

ENTERPRISE PROPOSAL MANAGEMENT SYSTEM

This application is a continuation of U.S. patent application Ser. No. 11/590,755, entitled "Enterprise Proposal Management System," filed Nov. 1, 2006, which issued as U.S. Pat. No. 7,506,001 on Mar. 17, 2009, the contents of which are hereby incorporated by reference in their entirety.

FIELD OF THE INVENTION

The invention relates an enterprise proposal management system that integrates with other enterprise data and systems to provide a comprehensive solution for managing the proposal lifecycle, storage, and retrieval of proposal-related documents, data, and supporting information systems.

BACKGROUND OF THE INVENTION

Enterprises and other organizations often have a diverse range of business needs, where one of the most important aspects of enterprise management is the sales and business development process. This often complex practice includes many tangible and intangible variables, ranging from competitive initiation of transactions to effective delivery of promises. Managing these variables is often disjointed, particularly for consultants, contractors, and/or employees that need to access specific data stored in multiple and disparate departments in order to respond to solicitations for products or services, generally referred to as a Request for Proposal. When entities solicit work through a Proposal, Request for Proposal, Request for Information, or Request for Quotes, a great deal of information may be requested. This information may include past performance, account and contract information, price quotes, corporate profiles, biographies, qualifications, financial data, third party recommendations, estimated completion dates, technical specifications, and proposed solution design, among many other things.

Managing a proposal lifecycle requires significant and diverse resources. An enterprise's "reach" may include operational aspects of developing a proposal solution, researching competitors, past account or relevant experience information, estimating costs, managing resources, and assembling documents into a packaged proposal, performing post-process review, among other things. Even after proposals are won or lost, enterprises may continue to be faced with significant information management needs and reporting, such as generating and executing contracts, deploying resources and personnel to fulfill the contract, interacting with vendors or sub-contractors, internal and external personnel review, contract management and fulfillment, process reviews, and/or developing timelines or milestones to ensure timely delivery, among other things.

Existing proposal management systems fail to provide solutions that manage all materials and information necessary for managing the full proposal lifecycle, let alone presenting the information to users in a useful, intuitive, and informative way. That is, existing systems take a divide-and-conquer approach, with distinct systems for managing proposals, contracts, personnel, scheduling, resumes, and day-to-day tasks. One drawback of these approaches is that each system usually includes a separate data store, resulting in unnecessary redundancy and data saturation, as well as scattering critical data throughout an organization. Even when disparate repositories can be integrated, such as using a data warehouse, existing systems are nonetheless unable to integrate all of an organization's repositories, particularly those residing on individual machines. This often results in competitive obstacles, such as competitor information being stored in private repositories, or bids or proposals being lost because data cannot be analyzed effectively. For example, without a unified data management solution, there is an inability to search all actual documents, descriptive information about materials may be unavailable. Instead, the organization must rely on manual processes, such as creating reports, developing scripts, or other processes that take a significant amount of time and resources. Moreover, the organization will not have the means to consistently update documents, control informational lifespan, or control the use of proposal information. This may lead to an organization being evaluated negatively because documents, resumes, personnel data, or other information is inaccurate or out-of-date, and proposal requirements are often difficult to correlate against products and services offered by an enterprise due to the lack of communication between systems.

Existing systems also suffer from drawbacks due to lack of prioritization and communication, as the existing systems have no mechanism for prioritizing or sharing information about the prioritized opportunities. This may result in imbalanced resource allocation, where low impact proposals are given significant attention while high impact opportunities languish. For example, an organization may win a large number of low impact proposals, yet these proposals may be less profitable or have less strategic impact for the organization. Moreover, the lack of visibility across groups and organizations, such as capture management, business development, proposal management portfolio management and/or operations prevents organizations from exploiting the benefits of collaboration. Without a simple and integrated display of the key performance indicators and metrics, teams cannot rally and work together successfully. Another problem of existing systems is maintenance and troubleshooting overhead, particularly when distinct suppliers or vendors supply the systems, introducing the need to contact third parties to utilize or maintain information. Yet another problem with existing systems is a lack of seamless communication and interaction, introducing problems in maintaining consistency or analyzing data to develop intelligent business strategies, among other problems.

These and other drawbacks are wide spread among existing systems.

SUMMARY OF THE INVENTION

Various embodiments and aspects of the invention address these and other problems of existing systems. One aspect of the invention relates to an enterprise proposal management system, where the system may include one or more modules for providing an integrated solution for managing a proposal lifecycle, where the proposal lifecycle may include business development, proposal execution, and/or delivery execution. The system may include tools that integrate with third-party products and other legacy systems to further support developing and maintaining processes associated with managing the proposal lifecycle. For example, these tools may be embedded and integrated with third-party desktop tools to allow a user to view documents, tasks, or other information using interfaces and systems that are already known to the user. Thus, an integrated approach is provided whereby a proposal is managed throughout its lifecycle, from deciding which proposals should be pursued and why, developing effective strategies for drafting and winning proposals, prioritizing proposal efforts, developing the proposal, collaborating with disparate teams to develop the proposal, managing proposals after they are won or lost, and/or managing and supporting information needed to ensure delivery of high-quality reference materials for proposal and/or business development teams. Moreover, such an integrated approach may enable providing a common interface for creating and/or managing associations between all components related to proposals and business development. For example, such associations may enable accessing documents and/or data from various perspectives, including, among other things, submitted proposals, related resumes, cameos, proposals, proposal sections, contracts, evaluations, past performance (e.g., similar clients, industries, etc.), project data (e.g., active and/or historical information related to contract dates, amounts billed, team members), as well as appropriate associations with external parties. This may provide benefits across various areas within an enterprise. For example, a sales team may easily respond to customer inquiries about whether an enterprise has experience or is qualified in a specific area, human resources may quickly locate and reference engineers with specific qualifications, marketing may ensure reports contain up to date and accurate information, in addition to many other benefits.

According to one aspect of the invention, the business development module may enable an enterprise to evaluate data relating to past, present, or anticipated proposals to assist enterprises in the decision-making process regarding which proposals to pursue. The business development module may draw upon tasks, documents, deliverables, and other information from various areas within an enterprise to build intelligence and develop competitive strategies while evaluating opportunities or other solicitations for proposals. The information within the business development module may be persistently available for analysis and/or reference. For example, the system may include a customer relationship or capture manager that may be useful in providing marketing materials or competitive analysis, identifying a relative competitive position of the enterprise, a likelihood of winning the proposal, or other intelligence gathering advantages. Similarly, the system may include a resume management system that may be useful in providing human resource materials and/or resumes, identifying subject matter experts, qualified personnel, enterprise capabilities, or other differentiating characteristics of the enterprise. By drawing upon all of the enterprise's resources, the business development module may enable the enterprise to identify potential business leads, set organizational priorities based on various factors (e.g., target high-impact proposals, deprioritize proposals where an incumbent is likely to win, etc.), thereby effectively leveraging resources when initiating a proposal.

According to another aspect of the invention, the proposal execution module may enable an organization to manage proposal development by drawing upon enterprise-wide resources to develop winning strategies. For example, the proposal execution module may collate information from various enterprise areas, such as marketing, human resources, contracts, resource planning, operations, procurement, finance, and others to develop effective proposals that best respond to customer needs. During proposal execution, an organization may respond to these needs by evaluating submission deadlines, bid/no-bid issues, bid schedules, or other issues, and the proposal execution module may provide a solution for overseeing an entire process of developing winning strategies for the proposal. The proposal execution module may provide one or more tools to manage scheduling and planning through assigning resources, documents, tasks, and/or deliverables to team members, as well as providing information and status to various teams within the enterprise. In addition, the proposal execution module may provide one or more utilities for identifying techniques and strategies for proposal drafting, such as deciding what needs to be written and when, developing outlines, storyboards, checklists, organizing reviews and submissions, or managing other tasks to ensure timely and comprehensive responses to opportunities. The proposal execution module may also provide one or more tools for drafting production proposals, such as creating new materials, assimilating best practices, graphics, boilerplate language, reviews, and other existing materials. The tools for drafting production proposals may follow a plan as developed using the utilities for identifying proposal drafting techniques and strategies, as described above. The proposal execution module may also include utilities for facilitating review of various tasks, documents, drafts, or other materials to be submitted for an opportunity, thereby providing a built-in mechanism for correcting, amending, and identifying errors and missing elements. The review utilities may also enable clarifying and changing requirements of an opportunity, all the while providing status reporting to ensure consistent collaboration and teamwork.

According to another aspect of the invention, the delivery execution module may enable an enterprise to manage enterprise tasks and scheduling relating to won proposals, communicate with systems in other enterprise areas, and/or enhance enterprise strategies for future proposals by facilitating post-process review. The delivery execution module may support post-process review of documents submitted by an organization, as well as collecting and reviewing proposals submitted by competitors to evaluate differentiating characteristics and approaches to developing proposal solutions. The information collected and analyzed by the delivery execution module may be useful to the business development module when evaluating subsequent opportunities by providing a mechanism for informing subsequent activities in a next proposal's lifecycle.

According to another aspect of the invention, the enterprise proposal management system may include an architecture that enables various modules to communicate seamlessly and re-engineer business processes. In one implementation, the architecture may include one or more data repositories that provide a data center for managing enterprise knowledge. The data repositories may integrate various enterprise areas that may be useful for managing proposals. For example, the data repositories may house all of the organization's documents and materials, including documents and materials relating to proposals, contracts, resumes, marketing, finance, customers, competitors, boilerplate, best practices, past performance, or any other documents or materials useful in evaluating, developing, and delivering proposals.

According to another aspect of the invention, the enterprise proposal management system may include one or more modules for managing various enterprise tasks. In one implementation, the modules for managing enterprise tasks may include modules for managing proposals, contracts, enterprise resources, reports, contracts, resumes, scheduling, customer relationships, or other tasks. The proposal management modules may enable an enterprise to evaluate, create, manage, look up, schedule, and/or view past, pending, and/or anticipated opportunities, thereby providing extensive management functions for managing documents, materials, tasks, and other proposal-related data. Moreover, similar management functions may be provided for other enterprise areas, wherein the enterprise proposal management system may account for an interrelation between enterprise areas, documents, materials, tasks, etc. to improve enterprise-wide evaluation, execution, delivery, and analysis. By drawing upon enterprise resources in various related areas, the enterprise proposal management system may provide an enterprise with robust knowledge for managing proposals. Correlatively, data, knowledge, and other information arising during a proposal lifecycle may be fed back into related enterprise areas. Thus, according to various aspects of the invention, proposal management may no longer be one of a distinct set of program areas or business units within an enterprise, but rather, part of a cohesive strategy for managing every aspect of the enterprise Other objects and advantages of the invention will be apparent to those skilled in the art based on the following detailed description and accompanying drawings.

BRIEF DESCRIPTION OF THE DRAWINGS

FIG. 13 is an exemplary block diagram of a resume manager according to one aspect of the invention.

DETAILED DESCRIPTION

Figure 1:
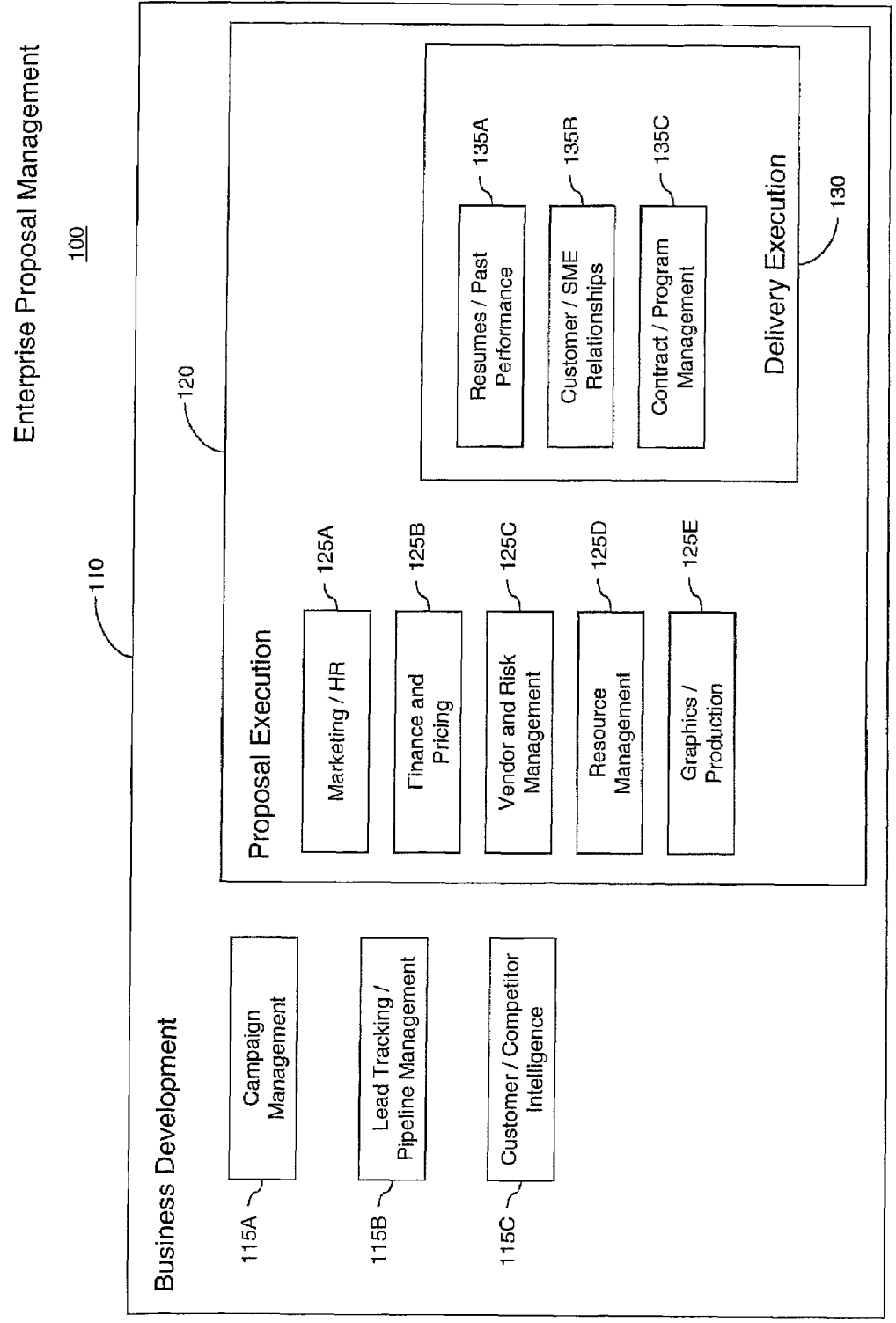
FIG. 1 is an exemplary block diagram representing an organization of enterprise tasks according to one aspect of the invention.

FIG. 1 illustrates an exemplary block diagram representing an organization of enterprise tasks according to one aspect of the invention. In one implementation, an enterprise proposal management system 100 may include, among other things, one or more business development (or capture management) tasks 110, one or more proposal execution tasks 120, and/or one or more delivery execution tasks 130, as well as integration tools that integrate with third-party products and other legacy systems to further support developing and maintaining processes associated with managing the proposal lifecycle. For example, these tools may be embedded and integrated with third-party desktop tools to allow a user to view documents, tasks, or other information using interfaces and systems that are already known to the user. Enterprise proposal management system 100 thus provides a comprehensive solution to managing enterprise tasks throughout their lifecycle and for managing workflow related issues, for example, by enabling an enterprise to manage business development needs through a combination of campaign management tools 115a, lead tracking/pipeline management tools 115b, and customer/competitor intelligence management tools 115c. Management tools 115a-c may therefore enable an enterprise to develop competitive strategies for driving sales or otherwise satisfying business development needs by accounting for internal and external factors.

An enterprise may also initiate and manage developing competitive proposals, bids, or other enterprise tasks using proposal execution tasks 120, which may include one or more of marketing and/or human resources management tools 125a, finance and pricing management tools 125b, vendor and risk management tools 125c, resource management tools 125d, and/or graphics/production management tools 125e. Proposal execution tasks 125a-e may enable the enterprise to manage and analyze past, present, pending, and/or anticipated contracts, proposals, campaigns, or other tasks to develop competitive, well-informed proposals. For example, post-process review of projects or proposals may provide insight into why a proposal was won or lost, allowing the enterprise to develop business strategies that respond to customer needs.

According to one aspect of the invention, business development (capture management) tasks 110 may include, among other things, campaign management tools 115a, lead tracking/pipeline management tools 115b, and/or customer/competitor intelligence tools 115c. Campaign management tools 115a may enable an enterprise to communicate with customers, partners, vendors, and potential prospects associated with a campaign. For example, an enterprise may use campaign management tools 115a to automate various marketing tasks, such as creating/providing a call center for customers to communicate with the enterprise, identifying best practices or reasons why a customer or vendor is appropriate for a particular campaign, capturing demographic information associated with campaign participants, providing a list of terms or definitions unique to a specific customer, specifying roll-up terms that may encompass an entire vertical, agency, or other grouping within an organization, or other tasks. Similarly, lead tracking/pipeline management tools 115b may bridge the gap between marketing and sales by supporting a proposal campaign or other sales campaign by identifying a lead (e.g., through a Request for Proposal), informing strategic decision-making, monitoring pending bids or proposals, identifying win themes to increase the likelihood of winning a contract, or other things. Customer/competitor intelligence tools 115c may also be used to facilitate business development, such as by providing detailed information regarding competitors and customers, enabling an enterprise to increase competitiveness of a proposal or bid by identifying differentiating characteristics, or for other purposes. Customer/competitor intelligence tools 115c may enable building profiles of competitors and customers based on in-process and post-process review of competitive factors (described in greater detail below), as well as enabling independent competitor research through Freedom of Information Act requests, or other means.

According to another aspect of the invention, proposal execution tasks 120 may include, among other things, marketing and human resource management tools 125a, finance and pricing tools 125b, vendor and risk management tools 125c, resource management tools 125d, and/or graphics/production tools 125e. Proposal execution tasks may enable an enterprise to manage a proposal or bid submission in response to an opportunity by simplifying information presentation and compilation. Marketing and human resource management tools 125*a* may support the enterprise, building and capturing information relating to customer and/or vendor relationships using proven public relations techniques, identifying personnel to support to a proposal, utilizing third-party recommendations, or other tasks for reaching out to customers and identifying enterprise qualifications. Finance and price management tools 125*b* may enable an enterprise to identify and generate costs, budget constraints, vendor costs, audit past project costs, or other things. Vendor and risk management tools 125*c* may enable an enterprise to manage relationships and risks with partners, customers, subsidiaries, or other potential vendors and/or sub-contractors for a project, proposal, or contract Resource management tools 125*d* may enable an enterprise to analyze resource deployment to establish timelines, milestones, deadlines, and other scheduling tasks, as well as enabling human resource management by integrating proposal execution with personnel calendaring, timesheets, evaluation, recruiting, updating resumes, or other tasks. For example, human resource data repositories may be used to identify personnel that are experts on subject matter relating to a proposal, Graphics/production module 125*e* may enable an enterprise to construct and develop attractive proposals and/or bids by providing best practices, boilerplate language, images, clip-art, sample documents, or other information that may be useful in generating contracts, proposals, and other enterprise documents.

According to another aspect of the invention, delivery execution tasks 130 may enable an enterprise to perform in-process management, ongoing, rolling, or post-process reviews, and archiving for closed proposals, ongoing or closed contracts, or other things. Delivery execution tasks 130 may include, among other things, resumes/past performance management tools 135*a*, customer/subject matter expert relationship management tools 135*b*, and/or contract/program management tools 135*c*. Resumes/past performance management tools 135*a* may enable an enterprise to manager personnel data, personnel performance, enterprise performance, or other things. Customer/subject matter expert management tools 135*b* may enable the enterprise to manage information relating to vendors, partners, customers, points-of-contact, and/or other entities encountered during the lifecycle of a proposal. Contract/program management 135 may enable an enterprise to manage contract performance, identify best practices, win themes, or other information relating to closed proposal efforts, or ongoing or closed contracts, or other information.

According to another aspect of the invention, the integration tools may integrate with various third-party tools, providing capabilities to create and manage integration criteria and configurations. By integrating with third-party tools, applications, and systems using the integration tools, the third-party products may be seamlessly integrated into the system at an architectural level. For example, the integration tools may integrate with third-party products using service oriented architecture interfaces or other industry standards. This may also provide the benefit of enabling third parties and partners to collaborate With an organization on a proposal using an interface that facilitates information sharing or provides virtual meeting spaces, in addition to maintaining legacy systems known to users. Those skilled in the art will recognize that although FIG. 1 depicts that a particular structural organization of enterprise tasks, the tasks may be closely related (or overlapping) and may interact to provide a robust solution for enterprise management.

Figure 2A:
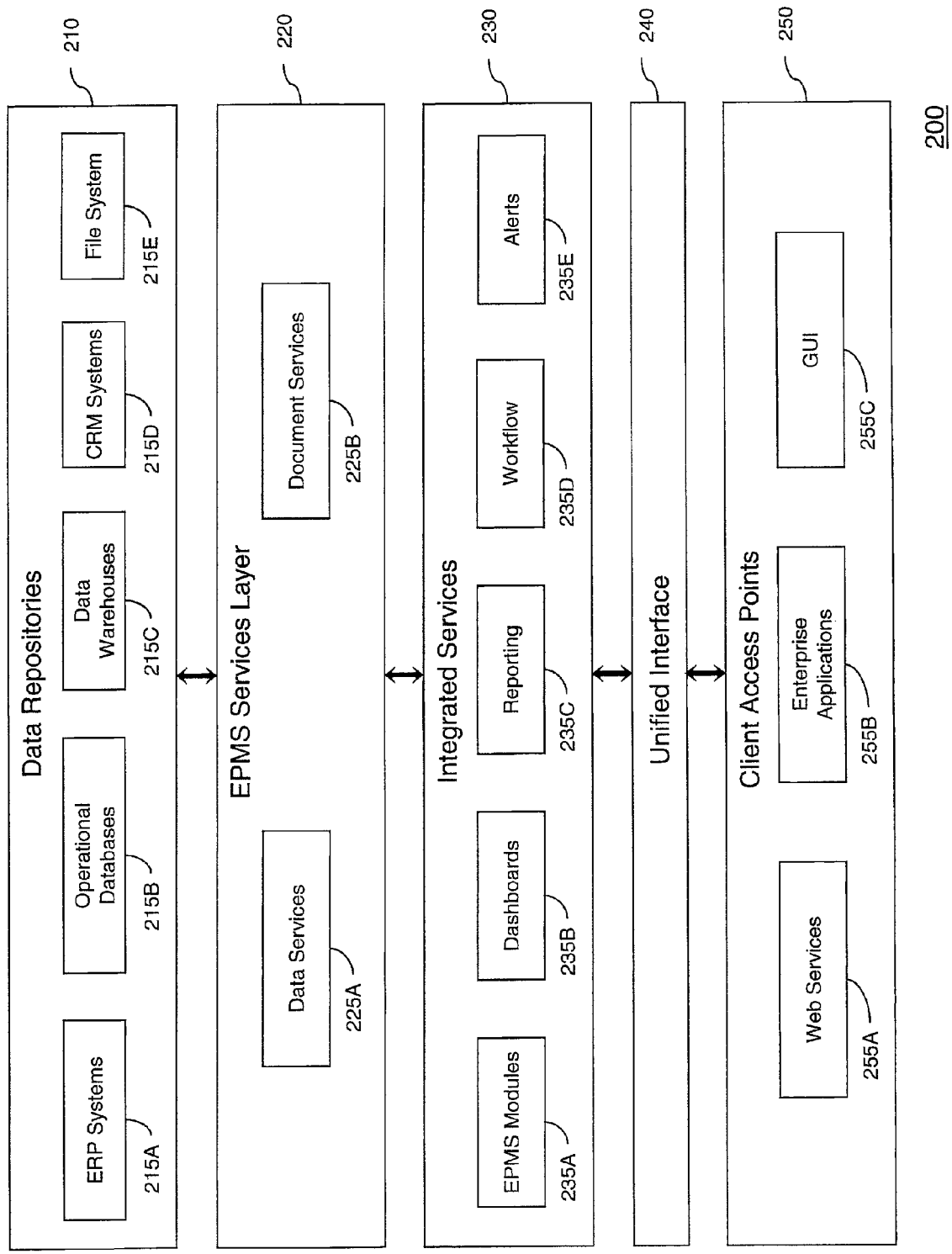
FIG. 2a is an exemplary block diagram of an enterprise proposal management system architecture according to one aspect of the invention.
Figure 2B:
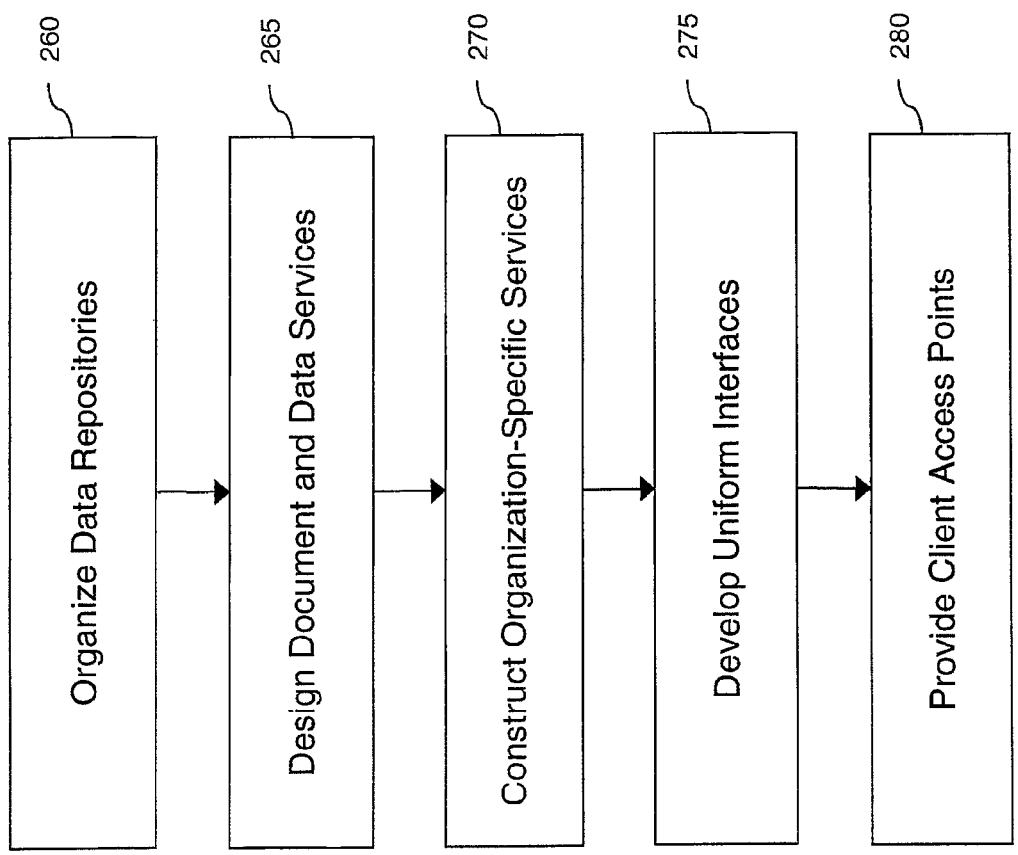
FIG. 2b is an exemplary flow chart describing an informational flow within an enterprise proposal management system according to one aspect of the invention.

Referring to FIG. 2*a*, an exemplary block diagram is provided of an enterprise proposal management system architecture 200 according to one aspect of the invention. FIG. 2*b* represents a corresponding exemplary flow chart describing an informational flow within the enterprise proposal management system 200 according to another aspect of the invention. Architecture 200 may enable various modules to communicate seamlessly using a layered approach that unifies application program interfaces. According to one aspect of the invention, architecture 200 may be implemented on a service oriented architecture platform, and a variety of modules may be provided to re-engineer business processes. For example, enterprise proposal management system 200 may provide functions and features for managing various documents and data abstractions that may relate to a proposal lifecycle. Thus, the system may include a data object for each data abstraction and/or a document object for each document, where the data objects and/or document objects are each described by a structured metadata and managed through one or more services. The data abstractions and/or documents are operatively coupled to a user interface through a search engine that communicates with one or more services and/or application program interfaces to thereby provide a link between data abstractions/documents and various client access points. In one implementation, architecture 200 may include, among other things, a data repository layer 210, an intermediate enterprise proposal management system service layer 220, an intermediate integrated services layer 230, a unified interface 240, and/or a client-access point layer 250.

According to one aspect of the invention, a data repository layer 210 may be organized and designed in an operation 260 to provide a common data center for enabling sharing between knowledge-management systems. In one implementation, designing data repositories operation 260 may include, among other things, defining a data organization for one or more data repositories 210 that include one or more enterprise resource planning systems 215*a*, one or more operational data repositories 215*b*, one or more data warehouses 215*c*, one or more customer relationship management systems 215*d*, and/or one or more file systems 215*e*. Enterprise resource planning systems 215*a* may coordinate various aspects of enterprise data management by communicating with operational data repositories 215*b*, data warehouses 215*c*, and customer relationship management systems 215*d*, thereby enabling data sharing between applications. Enterprise resource planning systems 215*a* may use a structured metadata format to describe all data and/or documents passing through enterprise resource planning systems 215*a*. For example, a resume may include meta fields for an individual's name, title, date hired, expiration date, associated projects, primary point of contact, secondary point of contact, proposals supported, job position, certifications, branch office, or other information. Similarly, a best practice document may include meta fields for a document name, title, business unit, summary, client name, contract winner, and/or a Bid and Proposal number, while a contract document may include a document name, business unit name, start date, end date, auto renewal option, category, industry, vendor, vendor manager, vendor web-site, final approver, notes for future negotiations, and/or other information. Each document (e.g., proposal documents, contracts, boilerplate documents, templates, etc.) or task (e.g., proposal, contract, project, templates, etc.) may similarly be described by metadata, thereby enabling the system to account for all of an enterprise's needs to a corresponding data abstraction, and a user interface may be customized to account for the various data abstractions, Thus, enterprise resource planning systems 215*a* may increase efficiency by allowing analysis of data across business units to enable better decision-making. Moreover, because user interfaces may be driven by the metadata, the user interfaces may be reconfigured to account for unique needs of a particular enterprise by extending or redesigning the metadata.

According to another aspect of the invention, designing data repositories layer 210 (operation 260) may include defining one or more data centers 215b-c for an enterprise. Data centers 215b-c may include one or more operational data repositories 215b configured for transaction management and ongoing efforts, and/or one or more data warehouses 215c configured for archiving older data that is valuable for auditing, best practices, intellectual property, or other things. Moreover, designing data repositories operation 260 may assign separate data stores to distinct business units within operational data repositories 215b and/or data warehouses 215c, where operational data repositories 215b may manage "active" workspaces, documents, or other materials for each business unit, and data warehouses 215c may archive workspaces, documents, or other materials for each business unit. Archiving data using data warehouses 215c may reduce data bottlenecks by offloading information that is too old to reference actively, but may nonetheless be valuable from an auditing or intellectual property perspective. In another aspect, customer relationship management systems 215d may further inform decision-making by providing analysis of customers, vendors, suppliers, markets, financial metrics, or other customer or partner related data. Thus, coordinating data repositories and/or systems within data repository layer 210 in operation 260 may enable efficient data management by easily collating and organizing information for analysis, strategic considerations, communications, or driving user interfaces that simplify a broad range of enterprise management tasks.

According to another aspect of the invention, data repository layer 210 may interface with an enterprise proposal management system services layer 220. In an operation 265, one or data services 225a and one or more document services 225b may be designed. Operation 265 may link data repositories storing and managing shared data organized in operation 260 with applications and interfaces presenting the data to users in a meaningful way. Enterprise proposal management system services layer 220 may include, among other things, one or more data services 225a and/or one or more document services 225b. Service oriented architectures are known to those skilled in the art, where a service may "own" certain information, which carries rights to create, update, and/or delete the owned information. Services may also "reference" information, which generally requires communication with an owner service to create, update, and/or delete the referenced information. Thus, data services 225a and/or document services 225b may own and/or reference certain information in the data repositories 210. For example, a document created using the structured metadata described above may have properties of a document (e.g., a spreadsheet, word processing, image, or other document) as well as properties of data (e.g., a proposal document may includes metadata describing the proposal's name, source, coordinator, budget, due date, etc.). Thus, data services 225a may own the document's metadata, while referencing the document itself. Similarly, document services 225b may own the documents, while referencing the document's metadata.

According to another aspect of the invention, an integrated services layer 230 may be constructed in an operation 270 to communicate with enterprise proposal management system services layer 220 to provide enterprise specific functionality. Integrated services layer may be constructed in operation 270 to own and/or reference data and/or documents in the data repositories 210 by passing through application program interfaces designed in operation 265 and associated with enterprise proposal management system services layer 220 also designed in operation 265. Integrated services layer 230 may include, among other things, services enabling business-specific functionality such as one or more enterprise proposal management system services 235a (e.g., proposal services, contract services, human resource services, customer relationship management services, resource planning services, or others), one or more dashboard reporting services 235b, one or more reporting services 235c, one or more workflow services 235d, and/or one or more alert services 235e. Enterprise proposal management system services 235a may enable managing, among other things, proposals, contracts, projects, or other enterprise tasks throughout their lifecycle. Dashboard service 235b may enable managing, among other things, user-friendly workspaces of various items of interest, such as an individual's active projects, expiring content, or other workspaces. Reporting services 235c may enable managing, among other things, debriefing analysis, customer or competitor analysis, or other meaningful analysis. Workflow services 235d may enable managing, among other things, scheduling, milestones, deadlines, due dates, or other scheduling services. Alerts services 235e may enable managing, among other things, notifications of pending deadlines, expiring content, specification changes, scheduling changes, or other action items. Each service of integrated services 235a-e may own or reference certain data and/or documents (by way of enterprise proposal management system services layer 220) to create, modify, update, and/or delete data and/or documents. Integrated services layer 230 may also include one or more services that enable interaction with external and/or third-party systems, thereby providing updated information from external content stores and data repositories. Those skilled in the art will appreciate that integrated services 230 may enable other functions, features, and implementations, and specific services may be added, modified, or removed without departing from the scope of the invention (e.g., enterprise proposal management system services 235a may include an Indefinite Quantity Indefinite Delivery service for an enterprise having a unique need to manage Indefinite Quantity Indefinite Delivery contracts).

According to another aspect of the invention, integrated services layer 230 may be coupled to a unified interface 240 in an operation 275. Operation 275 may include developing unified application program interfaces 240 that may provide to integrate the data repositories 210 and services 220-230 with client access points 250 provided in an operation 280. Providing client access points in operation 280 may include, among other things, providing one or more web services or peer-to-peer clients 255a and/or one or more enterprise applications 255b, which may be embedded within a graphical user interface 255c providing the ability to manipulate and control all aspects of enterprise management. Integrated architecture 200 may also enable integrating enterprise proposal management system functionality with existing systems, such as integrating with Microsoft Windows® or Office®. For example, in one implementation, a right-click on a Microsoft Windows® desktop may provide an option to create a new proposal, look up past performance history directly from within an a customer relationship manager and use the past performance history in an e-mail client, lookup executive biographies or other materials, share proposal sections using peer-to-peer technologies, or other functionality may be included for various systems and packages. Those skilled in the art will recognize that the client access points 250 may be uniquely tailored to needs of a particular enterprise, as the data repositories 210 provide all necessary data and document management, services, and application program interfaces to communicate with any number of client access point configurations.

According to another aspect of the invention, role based security may be provided to regulate access to various areas within enterprise proposal management system 200. In one implementation, the role based security may be configurable by a proposal manager, proposal delivery team member, or others with appropriate permissions. The role based security may define levels of access, points of access, or other security functionality, thereby limiting a user's access to data, program functions, and/or program features available and assigned to the user. The user's role may be based upon a user type, user group, or specific permutations may be defined for the user. For example, a dashboard 235*b* (e.g., an "executive" dashboard) may be configured to be available to users having rights to the "executive" area or module of the system, users having rights to certain projects, users having rights to user level, or others. Thus, permissions may be based upon roles, where roles may be assigned access rights to various components and modules of the system 200. By developing client access points, communication interfaces, services, and data repositories that are all role-based and can integrate with existing and third-party systems, an informational flow from a client perspective may include utilizing one or more graphical user interface modules that send data through to the data repositories. Moreover, the data repositories may be fully integrated with the graphical user interface through the services and application program interfaces, such that the graphical user interfaces may also be automatically populated and updated when changes occur in the data repositories.

Figure 3:
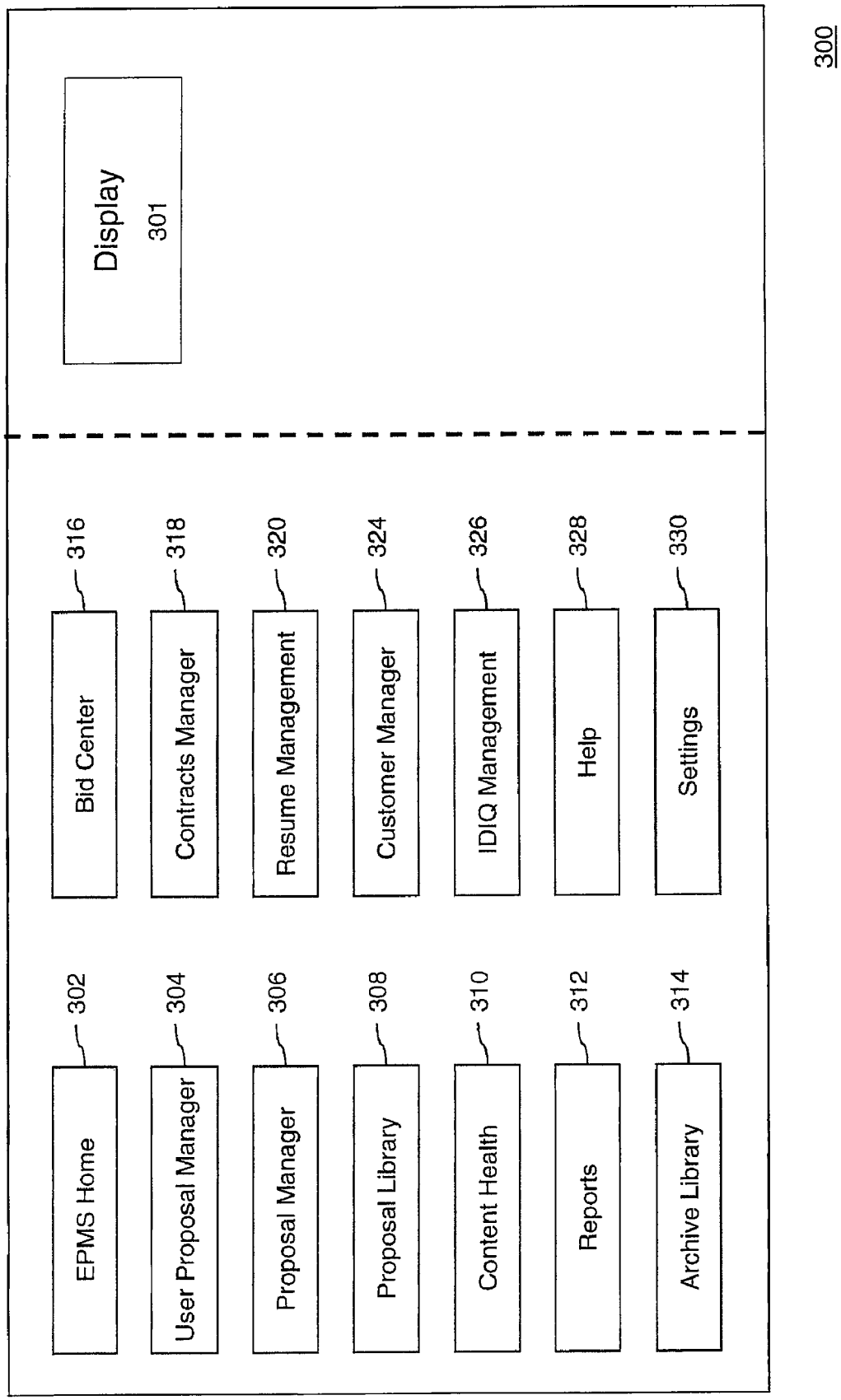
FIG. 3 is an exemplary block diagram of an enterprise proposal management system according to one aspect of the invention.

An exemplary client access point implementing the concepts described above is provided in FIGS. 3-13. Referring to FIG. 3, an enterprise proposal management system 300 according to one aspect of the invention may include, among other things, one or more of the following components: a display area 301, an enterprise proposal management system Home 302, a user proposal manager 304 (e.g., for managing proposals that a logged-in user is associated with), an enterprise proposal manager 306 (e.g., providing the ability to list and select proposals that the logged-in user has permission to view), a proposal library 308, a content health manager 310, a reports module 312, an archive library 314, a bid center 316, a contracts manager 318, a resume manager 320, a customer and competitor manager 324 (e.g., an integrated customer relationship management system), a help module 328, and a settings module 330.

In one implementation of the invention, enterprise proposal management system 300 may be configured to populate display area 301 in response to a user selecting one or more of modules 302-330, and enterprise proposal management system 300 may enable a display of various functions associated with the respective module. For example, the user may select enterprise proposal management system Home module 302, and display 301 may display, among other things, summary views of frequently used enterprise proposal management system modules, alerts, content health, reports, or dashboards (each of which may be populated using data and documents from the data repositories 210 using techniques described above; see FIG. 2). Display 301 may also display links to recent documents, upcoming tasks, schedules, frequently used tasks, search engines, help modules, or other information. Those skilled in the art will appreciate that display 301 may be configured in many different ways and may incorporate views of many different enterprise-related tasks and/or materials. Moreover, modules 302-330 may be modified and/or or deleted, or modules may be added to module 302-330 to respond to unique needs of an enterprise, or unique needs and work habits of the logged-in user.

Figure 4:
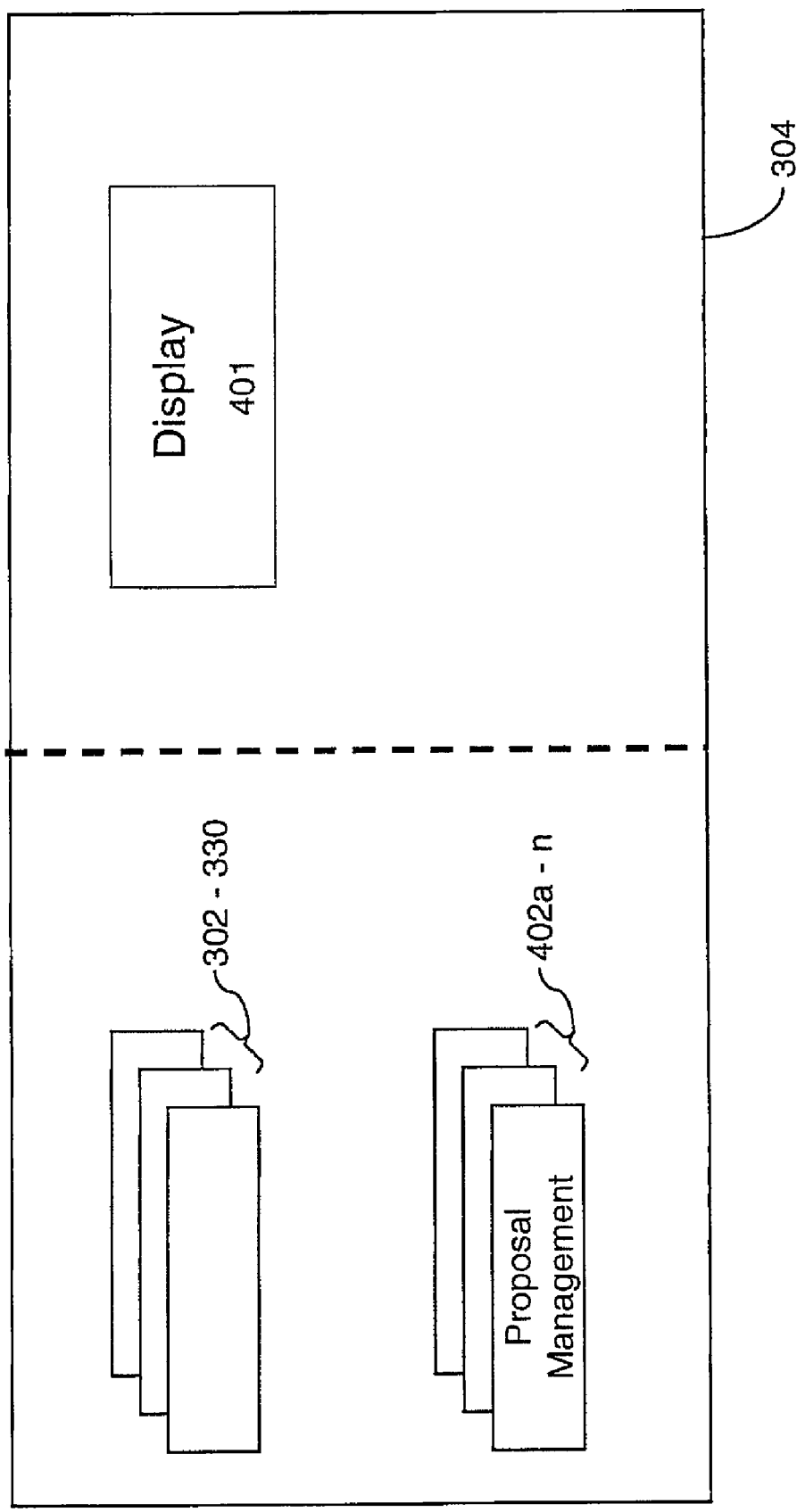
FIG. 4 is an exemplary block diagram of a user proposal manager according to one aspect of the invention.

Referring to FIG. 4, an exemplary user proposal manager 304 according to one aspect of the invention is provided. User proposal manager 304 may be displayed when a user selects user proposal manager 304 (see FIG. 3), for example, and may enable proposal managers, users, or others with appropriate permissions to create and manage user proposal workspaces. User proposal manager 304 may be implemented as a portal, peer-to-peer client, or otherwise, and may include, among other things, management functions 402*a-n* for a user to create, manage, look up, and/or view shared proposals, view document and/or task histories by user, business unit, or other criteria, view user-specific proposals, alerts, content, dashboards and dashboard reports (e.g., summaries of the user-specific proposals, alerts, content, etc.), individual performance reviews, proposal reviews, debrief materials, or other user-specific proposal data. Management functions 402*a-n* may also allow the user to view, manage, and/or manipulate customer and/or competitor data, including searching customer dictionaries (e.g., to identify customer-specific terminology, acronyms, etc.) or customer or competitor data repositories (e.g., to research potential customers and/or competition to formulate effective proposals), vendors associated with an account or proposal, proposal and support teams that created the proposal, or performing other management functions.

User proposal manager 304 may populate a display 401 when a user selects one or more of management functions 402*a-n*. For example, according to one aspect of the invention, a user may be guided through a process of creating a new proposal when the user selects a create new proposal function. The create new proposal process may include identifying a proposal name, a customer (or client) requesting the proposal, a solicitation number, a due date, a business unit, or other information. The process may then identify key issues in order to enable more informed decision-making. For example, one or more key issues for a customer may be identified (e.g., the customer may emphasize timely delivery over low costs), and a weight may be assigned to each key issue. An ability of one or more competitors to respond to the key issues may be identified, and a weight may be assigned to each competitor's ability to respond to each issue. The process may then identify an ability of an enterprise to respond to each key issue, and a weight may be assigned to the enterprise's ability to respond to each key issue. The process may then identify techniques for differentiating the enterprise to maximize competitive positions (e.g., partnering with another vendor), and d weight may be assigned to each differentiating technique. This information may then be correlated to generate a weighted score comparing a relative strength of the enterprise as compared to the competitors, which may be useful in determining a relative likelihood of the enterprise winning the proposal (i.e., a win theme). This information may then be used to prioritize the proposal within a current workflow and appropriate resources may be identified, assigned, or otherwise allocated to the proposal. Moreover, such prioritization may be used to later justify or validate a win-rate for the proposal, which may be useful for future business or capture development tasks.

According to another aspect of the invention, a proposal development team may be created to draft the proposal, and the proposal development team may be provided tools to generate a competitive production proposal by identifying customer goals, customer decision-makers and their key issues, a source that released the proposal opportunity, and/or identifying an incumbent preference. The proposal development team may also assess incumbent reputations, previously engagements with the customer, or other information. A proposal delivery team may be created to identify qualified personnel to work on delivering the proposal (e.g., by communicating with resume manager 320 to identify qualified subject matter experts, enterprise groupings, or others). External vendors, customers, and/or individuals may be assigned to work on the proposal as needed to provide subcontracting work or to fulfill other out-sourcing needs. After the proposal has been evaluated, approved, and prioritized, a proposal template may be selected to facilitate designing a production proposal document. For example, a template may be selected for Indefinite Quantity Indefinite Delivery, "Request for Proposal," brochure, Internet site, Question and Answer, Request for Information, or others. The template may be retrieved, generated, and/or drafted, and the proposal team may incorporate boilerplate language, images, and/or other information into the template to simplify drafting the proposal. In addition, relevant information may be automatically retrieved from the data repositories to populate the proposal effort to minimize future search time for the retrieved information. For example, if a proposal was initiated for the U.S. Army, all past proposals, resumes, terms and conditions, and past performance relating to U.S. Army proposals may be automatically collected for the proposal team. A suggested proposal team may be identified based on historical information, along with availability information for the suggested team members (e.g., by displaying a current workload or tasks for the team members). This may enable project or proposal managers to identify project team openings based on availability or qualifications. The project or proposal managers may be enabled to select templates based on prior submitted proposals (e.g., if the organization won the proposal, it may be beneficial to follow a similar strategy), or the project or proposal manager may select different templates for the current proposal (e.g., if the organization lost the past proposals, it may be beneficial to try a new strategy). The templates may include templates specific to a business unit, a proposal type, a client the proposal is being created for, or other criteria.

According to another aspect of the invention, proposal management functions 402a-n may enable users to look up proposals or search using a search engine. The search engine may enable a user to search for proposals containing one or more search terms, and the search may be narrowed according to client name, industry, proposal manager, subject matter expertise, personnel, writer, partners, competitors, and/or other criteria. The search engine may also include advanced search parameters that allow search capabilities across multiple functions or modules, using either full text or metadata search capabilities. When a document or information is uploaded to the data repositories, the document or information may be indexed in a searchable library (described in greater detail below) and can be referenced using search mechanisms. For example, a document may be considered a best practice material and the document may be submitted for approval as a best practice. Once approved, the document may be indexed in the searchable library as a best practice and returned in subsequent search queries. In another example, a document may be indexed according to a writer of the document, which may enable defining a set of proposals based on a proposal writer's work history. The metadata may track proposals, proposal sections, individuals, tasks, or other information and create associations between various areas. Thus, search queries may be based on varying levels of specificity or permutations, enabling detailed search capabilities for all enterprise documents, materials, and other information. The search engine may enable queries in free text or through navigating a folder structure, and a user's ability to search or manipulate documents may depend on the user's roles, permissions, and/or access rights to the documents. Moreover, any information that is used as a result of a search query is tracked for its usefulness (e.g., a particular search result that is used in a proposal may be weighted to be a top search result for a similar, subsequent query). Thus, content managers may track which documents or information is useful or not useful, and the content managers may make changes as appropriate.

Figure 5:
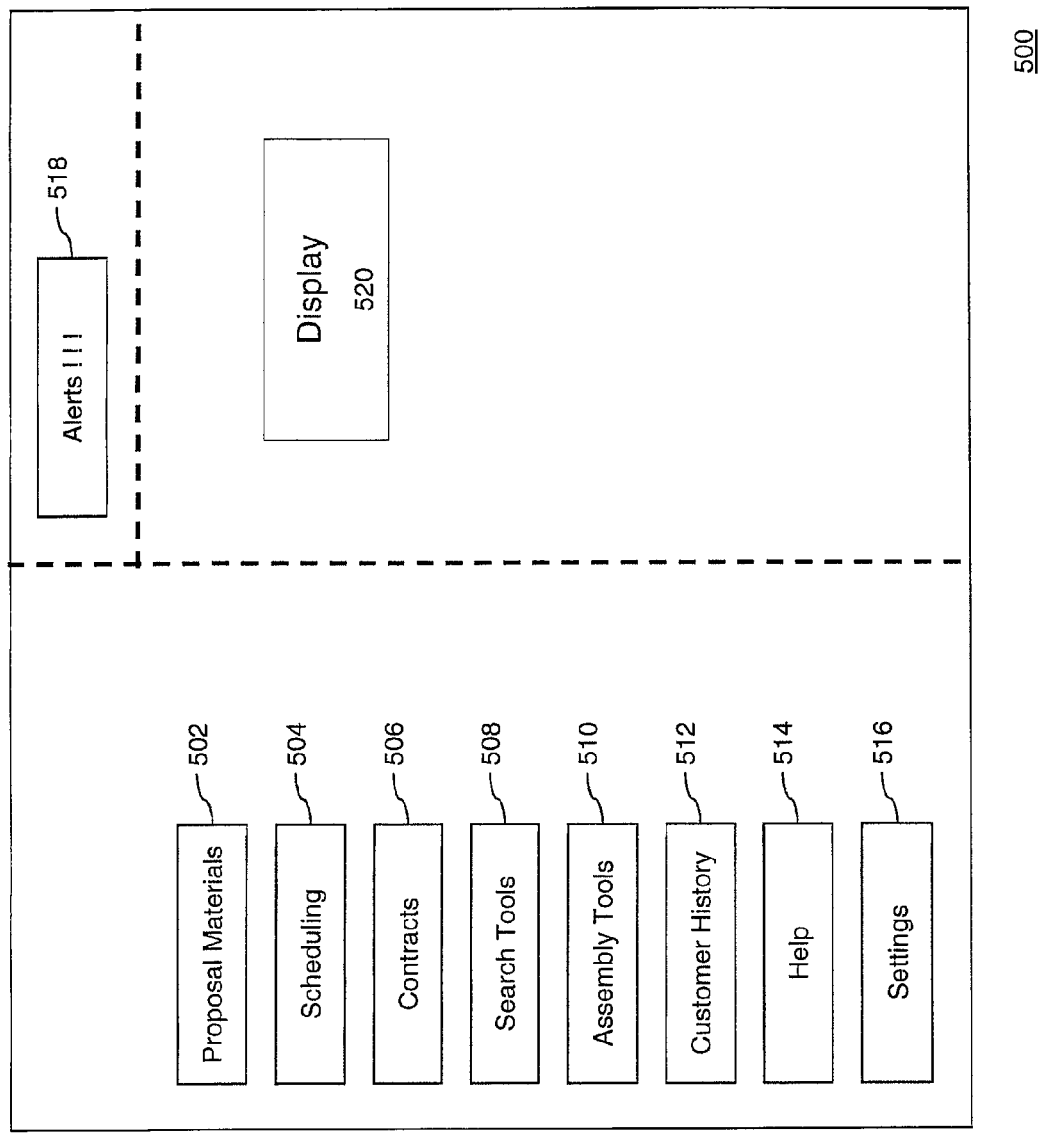
FIG. 5 is an exemplary block diagram of a collaborative proposal area according to one aspect of the invention.

Referring to FIG. 5, an exemplary collaborative proposal area 500 according to one aspect of the invention is provided (e.g., a specific instance of a proposal). Collaborative proposal area 500 may be displayed when a proposal manager, proposal delivery team member, or others with appropriate permissions select a specific proposal effort (e.g., from among a user's list of proposals, from an active proposal dashboard or any other dashboard, customer and competitor module, results of a search query, etc.). Collaborative proposal area 500 may enable proposal managers, team members assigned to the proposal, or others with appropriate permissions to manage proposals over the entire life cycle of a proposal (e.g., from business development and capture to archive). Collaborative proposal area 500 may be implemented as a portal, peer-to-peer client, or otherwise, and may include, among other things, a proposal materials option 502, a scheduling and task option 504, a contacts option 506, a search tools option 508, an assembly tools option 510, a customer history option 512, a help option 514, a settings option 516, one or more alerts 518 (e.g., to notify a user of a change to a proposal or to provide notification of other important information), and/or a display 520. Role-based permissions for collaborative proposal area 500 may be limited to rights assigned to team members for the proposal or others with appropriate permissions.

In one implementation, display 520 may be configured to initially display a proposal summary and/or status. The proposal summary may include, among other things, a client name, opportunity name, a proposal description, a proposal manager, a business unit, a solicitation number, a website reference, a proposal type, a proposal source, a proposal coordinator, a charge code, a budget constraint, a due date, a percentage completed, a proposal status, a proposal phase, a risk category, an active review team, notes, attachments, solicitation number or source, and/or other information. The proposal summary may also include a dashboard for managers, review teams, or others with appropriate permissions to review the proposal, a task status indicating personnel supporting one or more tasks, due dates for the tasks, descriptions of the tasks, user-specific task summaries, or other information. In some implementations, display 520 may include one or more alerts 518 that may notify a user of pending deadlines, overdue tasks, updates to a proposal (e.g., when a customer amends a Request for Proposal), or other alerts. Alerts 518 may be displayed persistently necessary actions have been taken to clear the alerts 518. Information from within collaborative proposal area 500 may be tracked and made usable for other business units, program areas, or others with appropriate permissions accessing the enterprise proposal management system. For example, if a proposal manager increases a risk level for a proposal from Low to High, the risk level may be automatically displayed on a management team dashboard, and as a result, the management team may take appropriate action. In addition, other alert mechanisms may notify appropriate personnel of changes. For example, if budget parameters are exceeded, an e-mail notice and/or an automated phone notification may be used to notify appropriate personnel. Task assignments may be collected from each collaborative proposal area and stored to allow individual proposal team members, managers, human resources, or others with appropriate permissions to have tangible performance metrics for individuals. For example, if an individual is preparing for an annual performance review, the individual can demonstrate their workload handling capabilities and explain specific contributions to various projects, proposals, or other tasks.

According to one aspect of the invention, a proposal manager, proposal delivery team member, or others with appropriate permissions may edit displayed proposal data by selecting settings options 516. Upon selecting settings option 516, display 520 may be configured to display options for editing the proposal data. The proposal data (e.g., stored in data repository layer 210 of FIG. 2) may be updated to reflect changes. Editing proposal data may include editing one or more aspects of the proposal summary, including the proposal's name, status, review team, and/or other aspects of the proposal.

Settings option 516 may also provide a proposal manager, proposal delivery team member, or others with appropriate permissions with an option to close out a proposal. Upon selecting to close out the proposal, display 520 may be configured to provide options (e.g., a menu including a series of steps) to close out the proposal. These options (or steps) may include one or more of collecting final metrics, completing debrief notes, uploading submitted materials, uploading proposal sections, evaluating vendors, contractors, or partners, and/or providing additional notes. Closing out a proposal may provide valuable intelligence metrics by identifying points of success, points of failure, and/or other information that may be used to populate customer dictionaries, customer and competitor intelligence modules, resume tracking modules, data repositories, or other areas. Thus, the close-out information may be used for subsequent business development or capture tasks, subsequent proposal execution tasks, subsequent delivery execution tasks, or other enterprise tasks.

When the proposal manager, proposal delivery team, or others with appropriate permissions elect to collect final metrics, display 520 may provide options to enter information regarding the proposal. This information may provide useful metrics and information that can be used for subsequent business development or capture tasks, subsequent proposal execution tasks, subsequent delivery execution tasks, or other enterprise tasks. The information may include, among things, one or more of the following: a submission date, a decision date, a final proposal value, a re-bid date, a result (e.g., win, loss, client withdrawal, etc.), future alerts, contact information, competitors, or other information. For example, if the proposal opportunity covered a three year term and ended in a loss, the system may email appropriate individuals that the opportunity is being opened for re-compete. As a result, the business development and capture team and proposal team may be provided an early alert and the initial submitted (lost) proposal. A proposal that won previously can be compared to the losing submitted proposal, dramatically increasing the ability to create a winning proposal the next time around. Additional information about a client opening the opportunity for re-compete can also be accessed from the customer and competitor module as well.

When the proposal manager, proposal delivery team, or others with appropriate permissions elect to complete debrief notes, display 520 may provide options to enter information for summarizing a debriefing session. The information may include, among other things, one or more of the following: names and job titles of presenters at a debriefing session, attendees of the session, a date of the session, a location of the session, identified proposal strengths, identified proposal weaknesses, and/or additional notes or information.

When the proposal manager, proposal delivery team, or others with appropriate permissions elect to upload submitted materials, display 520 may provide options to upload documents associated with the proposal that can be used for persistent storage of proposal documents, images, or other proposal-related documents. (e.g., for storage in one or more data repositories in data repository layer 210 of FIG. 2). The documents may include, among other things, one or more of the following: one or more final proposals, one or more final cost proposals, one or more oral arguments, one or more final resumes, and/or one or more additional documents. An option may be provided to upload one or more of the documents to customer relationship management Systems (e.g., proposal documents stored in an operational data repositories 215b or data warehouse 215c may be mirrored or otherwise replicated in customer relationship management Systems 215d to associate the documents with a customer, vendor, etc.). For example, the uploaded materials may be evaluated for win themes and other characteristics, which may be associated with a proposal or individual sections of the proposal. Moreover, individual sections may be automatically merged to create a complete proposal or routed to various program areas or business units (e.g., for finance or profitability analysis) and/or stored in secured data repositories for classified or other sensitive materials.

When the proposal manager, proposal delivery team, or others with appropriate permissions elect to evaluate vendors, display 520 may be configured to provide options to enter information regarding vendors. This information can be used to manage and rank vendor relationships. The information may include, among other things, one or more of the following: a vendor name (e.g., the vendor's company name), a point of contact, a job title, a role in the proposal, a classification, an evaluation, a ranking, vendor strengths, vendor weaknesses, a recommendation, a reason for the recommendation, or other information. This information can be accessed through a vendor management module and/or be fed back into external vendor management systems. Thus, future opportunities and subsequent business development and capture or proposal execution tasks may benefit from previous working relationships to minimize risk and create winning proposals. In addition, various program areas and business units within an enterprise, (e.g., from business development to human resources to others) can quickly find vendors with successful past working experience, resulting in a time savings, improved quality and increase response time.

When the proposal manager, proposal delivery team, or others with appropriate permissions elect to enter additional notes and/or respond to the feedback survey, display 520 may be configured to provide options to enter information and or documents relating to the proposal that can be used to inform decision-making. An option may be provided to send a standardized survey or an ad-hoc survey to the proposal delivery team, proposal manager, or others to solicit feedback to identify best practices.

After completing the additional notes and/or feedback survey, a confirmation may be provided that the proposal has been closed, and information may be presented describing an availability of information and/or documents relating to the closed proposal. A proposal may have one or more states, where for each state, the proposal's relationship or interaction with the enterprise may change. For example, the proposal may be set to an inactive state, where the proposal can not be accessed through the search mechanisms. Further, access to inactive proposals may be limited to personnel that had access to the proposal while it was active, and the proposal may be excluded from global searches to improve quality of the searches by excluding stale information and preventing dilution of relative content. The proposal may be moved to an archive data repository after an extended length of time (e.g., after four years or other configurable length of time), at which time the proposal may be accessed through archive library module 314 of FIG. 3.

Collaborative proposal area 500 may include a proposal materials option 502, where upon a proposal manager, proposal delivery team member, or others with appropriate permissions selecting proposal materials option 502, display 520 may be configured to display one or more of the following: a win themes and key issues differentiator, answers to a proposal influencer questionnaire, Request for Proposal source materials, customer related materials, background materials, best practices, assignments, proposal sections, partner submissions, cost proposals, supporting images, production proposal, and/or other materials related to a proposal. Win themes and key issues differentiator may include customer key issues, factors leading to winning a proposal, factors leading to losing a proposal, or other information that can be used to develop strategies for future proposals. Influencer questionnaire may ask questions regarding a customer, competitors, or other information to identify how the customer chooses a proposal. Request for Proposal source materials may include actual source documents for the Request for Proposal, Request for Proposal amendments, additional notes or comments, images, or other data specific to the customer's requirements. Customer related materials may include documents describing a customer or prospect, their industry, financial statements and related news or press releases. Best practices may include documents describing general techniques for drafting proposals or formulating strategies (e.g., how to read a federal government Request for Proposal). Assignments may include one or more tasks relating to creating or executing the proposal, including personnel or team members supporting a task, a task status, a task priority, a due date, a percentage complete, or other information. Assignments may be integrated into a calendar program or other scheduling program. Proposal sections may include one or more documents to be included in a proposal, one or more documents to be used as references when drafting the proposal, or other documents. Partner submissions may include one or more documents provided by partners, vendors, and/or sub-contractors collaborating on a proposal. Cost proposals may include one or more documents associated with costs for one or more aspects of a proposal. Supporting images may include one or more images that can be incorporated into a document or proposal (e.g., as clip-art). Production proposals may include a finalized document reflecting a finalized proposal, and a production proposal may include a synthesis of one or more other documents, images, or other information. Production proposals may be submitted to a customer in response to a Request for Proposal, for example. Each document may include writers or personnel associated with the document, a checked in/checked out status, an assigned writer or personnel, a last modified date, a due date, versions, or other information associated with the document.

Upon a proposal manager, proposal delivery team member, or others with appropriate permissions selecting scheduling option 504, display 520 may be configured to display one or more of the following for a proposal: a proposal milestone calendar, a proposal assignment calendar, and/or other scheduling information or calendars. Proposal milestone calendar may be configured to display proposal milestones in a monthly view, daily view, list view, user-specific view, or other views. Proposal milestone calendar may enable proposal managers or others with appropriate permissions to schedule various benchmarks to ensure that the proposal is completed on time and correctly. Similarly, proposal assignment calendar may be configured to display team and/or user tasks for a proposal, and proposal assignment calendar may be configured to display assignments in a monthly view, daily view, list view, user-specific view, or other view. Moreover, proposal milestone calendar and/or proposal assignment calendar may be further configured to integrate with existing systems to simplify user access (e.g., tasks and/or milestones may be displayed in Microsoft Outlook®). The proposal milestone and/or assignment calendar may be configured to display one or more alerts 518 in order to provide users, managers, administrators, or others with appropriate permissions with alerts of approaching or overdue deadlines, or other scheduling related alerts. This information may be used to collate events and tasks from throughout an enterprise for use throughout the enterprise. For example, all calendars and tasks for individual users can be collected and shared with a master resource schedule. Moreover, management personnel may be provided a master proposal calendar illustrating all proposal milestones for all active proposals in a single calendar view. Likewise, task assignments can be displayed for all proposals in a single list. Other implementations may make use of the scheduling features as needed to respond to unique needs of an enterprise.

Upon a proposal manager, proposal delivery team member, or others with appropriate permissions selecting contacts option 506, display 520 may be configured to display one or more of the following for a proposal: a current proposal team, one or more subject matter experts, a resume history, and/or other contact information. The current proposal team may include one or more employees, partners, or other personnel working on a proposal, including contact information, enterprise division, or other information for the respective personnel. The proposal manager, proposal delivery team member, or others with appropriate permissions may add, delete, or modify one or more team members. Subject matter experts may similarly include one or more employees, partners, or other personnel that have subject matter expertise in an area relating to the proposal. The resume history may include one or more resumes for the proposal team, subject matter experts that have been previously used on similar proposal opportunities, or others. This information may be automatically populated based on information entered when the proposal opportunity was originally created.

Upon a proposal manager, proposal delivery team member, or others with appropriate permissions selecting search tools option 508, display 520 may be configured to display one or more of the following search options: a proposal library search, a Question and Answer search, a submitted proposals search, an archived proposals search, and/or a similar proposals search. Proposal library search may enable the proposal manager, proposal delivery team member, or others with appropriate permissions to select a library, folder, and/or terms to search. For example, a proposal coordinator may specify to search for resumes within a specific business unit that include a search term. Users may search for Questions and Answers, submitted proposals, archived proposals, and/or similar proposals according to a client, industry, proposal manager, subject matter expert, writer, partner, competitor, or other criteria.

Upon a proposal manager, proposal delivery team member, or others with appropriate permissions selecting assembly tools option 510, display 520 may be configured to display one or more of the following relating to assembling a proposal: a merge proposal materials, a best practices (e.g., taken from proposal library 308 of FIG. 3), an estimated page count, and/or other documents or tools useful in assembling a final proposal document. The merge proposal materials may include a proposal generator, where the proposal manager, proposal delivery team member, or others with appropriate permissions may select one or more proposal materials. The proposal manager, proposal delivery team member, or others with appropriate permissions may select proposal materials from proposal materials option 502 or specify a library from which to pull documents. Boilerplate language and/or documents may also be selected, including documents for a cover sheet, a table of contents, a summary of requested service, a terms and conditions, a subcontracting limitations, past performance statements, a public policy statement, a committee override clause, a performance metric, a reporting structure, or other documents. The proposal generator may allow specifying an order of the proposal materials, provide a name and storage location for a merged document, or other information. The page count estimate may estimate a page count of the merged document before generating the merged document (e.g., if a Request for Proposal specifies a page limit, the page count estimate may be used to ensure that the proposal remains within the limit).

Upon a proposal manager, proposal delivery team member, or others with appropriate permissions selecting customer history option 512, display 520 may be configured to display one or more of the following related to a specific customer: one or more current proposal teams (e.g., proposal teams supporting a proposal for the customer), one or more subject matter experts (e.g., subject matter experts in the customer's industry), a resume history (e.g., resumes of personnel supporting the customer), one or more submitted proposals (e.g., finalized proposals for the customer), a customer dictionary (e.g., acronyms or terms of art specific for the customer), and/or competitive threats (e.g., an enterprise may elect to forego submitting a proposal when the customer frequently hires a single competitor).

Figure 6:
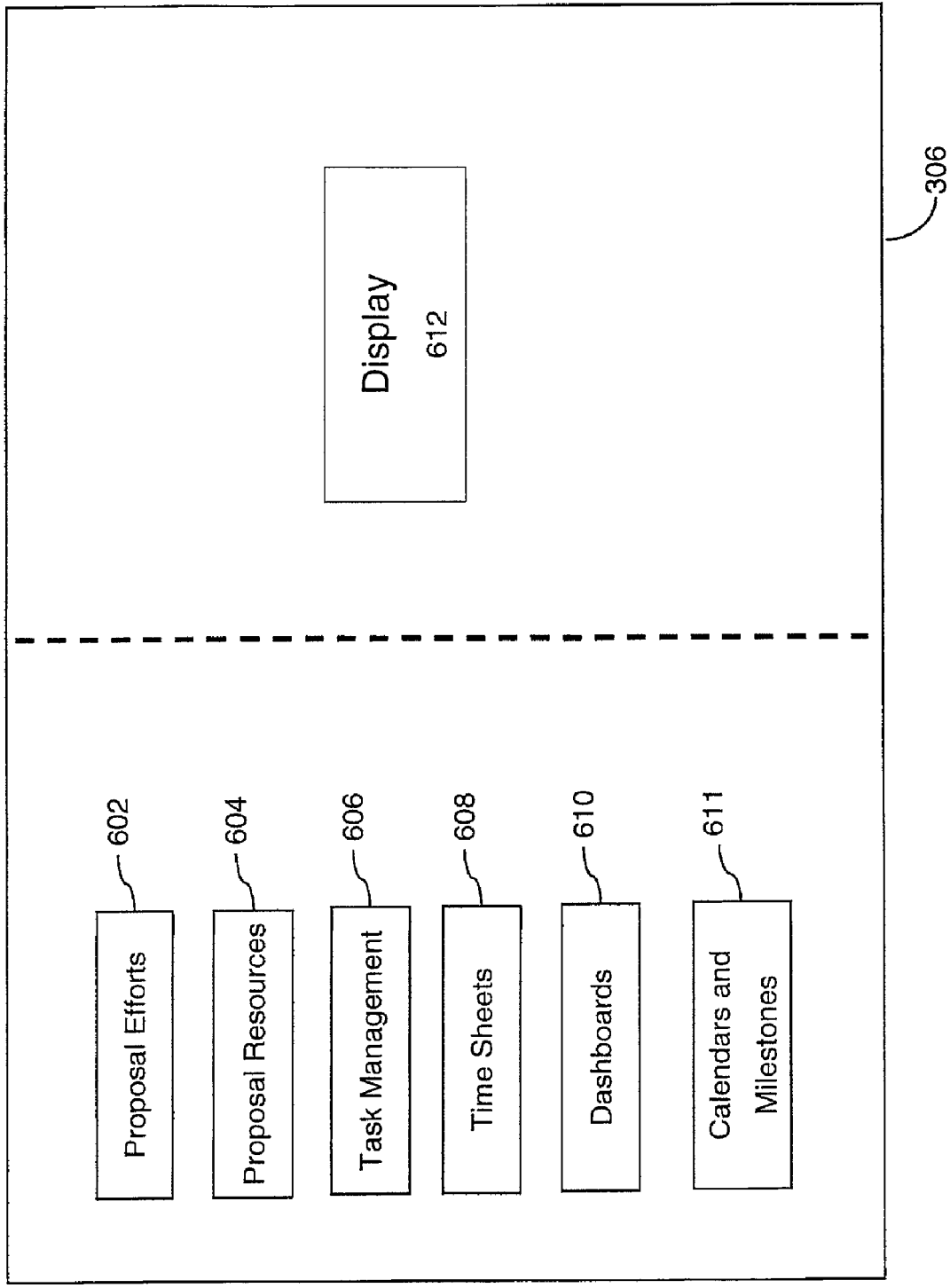
FIG. 6 is an exemplary block diagram of an enterprise proposal manager according to one aspect of the invention.

Referring to FIG. 6, an exemplary enterprise proposal manager 306 according to one aspect of the invention is provided. Enterprise proposal manager 306 may be displayed when a proposal manager, proposal delivery team member, or others with appropriate permissions select enterprise proposal manager 306 (see FIG. 3), and may enable proposal managers, proposal delivery team members, or others with appropriate permissions to create and manage proposals on an enterprise-wide basis. Enterprise proposal manager 306 may be implemented as a portal peer-to-peer client, or otherwise, and may include, among other things, options to view, create, and/or manage proposal efforts 602, proposal resources 604, task management 606, timesheets 608, dashboards 610, and/or calendars and milestones 611. Enterprise proposal manager 306 may also include a display 612 that is configured to display information relating to a selected option 602-611.

Upon a proposal manager, proposal delivery team member, or others with appropriate permissions selecting manage proposal efforts option 602, display 612 may be configured to display one or more of the following options for viewing enterprise proposals: pending proposals, active proposals, submitted proposals, all proposals, and/or a master view of proposals. For example, upon selecting pending proposals, display 612 may display a list of proposals that an enterprise is developing, considering, drafting or otherwise processing (but not yet completed). The list may include a list of one or more proposal names, proposal types, business development representatives, product lines, and/or other information relating to the pending proposals. Upon selecting active proposals, display 612 may display a list of proposals for which the enterprise has been awarded a contract, where the list may display one or more proposal names, proposal types, contract values, proposal managers, and/or other information relating to the active proposals. Upon selecting submitted proposals, display 612 may display a list of proposals for which the enterprise has submitted a proposal and awaits a customer decision regarding the proposal. The list may include one or more proposal names, proposal types, business development representatives, product lines, bid values, and/or other information. Upon selecting all proposals, display 612 may display a list of all pending, active, and/or submitted proposals may be displayed, including some or all of the information described above. Upon selecting master view of proposals, display 612 may display a comprehensive list of information relating to all proposals, including one or more of a proposal name, a proposal type, a due date, a proposal manager, a business development representative, a budget, a contract value, a proposal phase, a risk assessment, a product line, and/or any other information relating to enterprise proposals.

Upon a proposal manager, proposal delivery team member, or others with appropriate permissions selecting proposal resources option 604, display 612 may be configured to display one or more of the following options for viewing enterprise proposals: by proposal manager, by person, by business unit, by product line, and/or by other criteria. For example, upon selecting the option to view proposals by proposal manager, display 612 may provide a prompt for a name or selection of a name from a list. Display 612 may thus be configured to display a list of proposals being supported by a person matching the entered or selected name, where the list of proposals may include a product line, a proposal name, the proposal manager, a due date, a contract value, one or more persons assigned to a proposal, a business development representative, and/or other proposal information for those proposals to which the proposal manager is assigned. Similarly, upon selecting the option to view proposals by person, product line, business unit, and/or other criteria, display 612 may be configured to display proposal-related information for those proposals that match the entered or selected criteria.

Upon a proposal manager, proposal delivery team member, or others with appropriate permissions selecting task management option 606, display 612 may be configured to display one or more tasks relating to enterprise proposals, where the tasks may be organized and/or displayed according to proposal, person, product line, business unit, and/or other criteria, or a list of all tasks may be displayed. Task information may include, among other things, proposal names, critical tasks for the proposals, one or more persons assigned to complete the tasks, a due date for the tasks, and/or a due date for the proposals.

Upon a proposal manager, proposal delivery team member, or others with appropriate permissions selecting timesheets option 608, display 612 may be configured to display one or more timesheets relating to enterprise proposals, where the timesheets may be organized and/or displayed according to personnel, business units, proposals, and/or other criteria. For example, display 612 may be configured to display an account of time spent on a proposal when timesheets are displayed according to proposals. The account may include a proposal name, a proposal type, a number of hours spent on the proposal, a business development representative, a proposal value, a product line, a result (e.g., win, loss, withdrawn, pending, etc.), or other criteria, which may be tracked together calendars and milestones 611 (e.g., calendars and milestones 611 may assign tasks and deadlines to users and/or groups to assist in managing delivery of the proposal). Similar accounting data may be displayed when timesheets are selected according to personnel, business unit, or other criteria. The timesheets may be used to evaluate enterprise performance metrics or may be integrated with human resource or accounting systems. For example, evaluating enterprise performance metrics may include tracking a number of enterprise hours spent on a proposal and a proposal win value (e.g., $0 if the proposal is lost, or a dollar value if some or all aspects of a proposal are awarded to the enterprise). These values may then be used to identify a return ratio. For example, an exemplary business unit (e.g., Information Technology) may submit four proposals, where 3378 hours are spent on a first proposal that is lost (win value of $0), 2368 hours are spent on a second proposal with a win value of $125,000, 1300 hours are spent on a third proposal with a win value of $88,365, and 1808 hours are spent on a fourth proposal with a win value of $429,000. By then dividing a sum of the win values ($642,365 for the example above) by a total number of hours (8854 for the example above), a return ratio for the business unit may be obtained ($72.55/hour). Return ratios and performance metrics may be calculated in any suitable manner that meets performance, financial, or other objectives of an enterprise.

Upon a proposal manager, proposal delivery team member, or others with appropriate permissions selecting dashboards option 610, display 612 may be configured to display one or more dashboards for evaluating enterprise proposals, where the dashboards may include one or more of the following: a proposal status (e.g., win, loss, or pending) by business unit (or other criteria), a win rate by business unit (or other criteria), a proposal phase (e.g., a pending proposal is awaiting a customer response), a business unit workload, and/or a business unit submission totals. In response to selecting the proposal status dashboard, display 612 may be configured to display a bar chart depicting various business units within an enterprise, with a bar for won, lost, and/or pending proposals for each business unit. The bars may be configured to be displayed according to contract value or other criteria. Other forms may be used to display win, loss, and/or pending proposals, including pie charts, scatter charts, or other forms, and different criteria may be used as would be relevant for the needs of a particular enterprise. Upon selecting the win rate by business unit dashboard, display 612 may be configured to display a percentage of proposals won for each business unit (e.g., as a bar chart). Upon selecting the proposal status dashboard, display 612 may be configured to display various proposal statuses (e.g., a proposal may be divided into a number of phases), and a percentage of enterprise proposals within one or more proposal phases may be displayed (e.g., as a box chart, pie chart, or other form). Upon selecting the business unit workload percentage dashboard, display 612 may be configured to display one or more percentages that indicate a percentage of overall workload of various proposal types across a business unit. For example, a date range may be specified (e.g., 120 days), and a percentage of total proposals for a business unit may be identified (e.g., 21% of proposals relate to business process reengineering, 43% of proposals relate to heavy construction, and 36% of proposals relate to information technology infrastructure). The business unit workload dashboard may determine percentages based on hours, number of proposals, and/or other criteria, or any combination thereof. Similarly, the business unit submission totals dashboard may display information relating to values of submitted proposals. Those skilled in the art will appreciate that dashboards 610 may be configured to analyze and/or display data in various ways in order to dynamically respond to particular needs of an enterprise.

Figure 7:
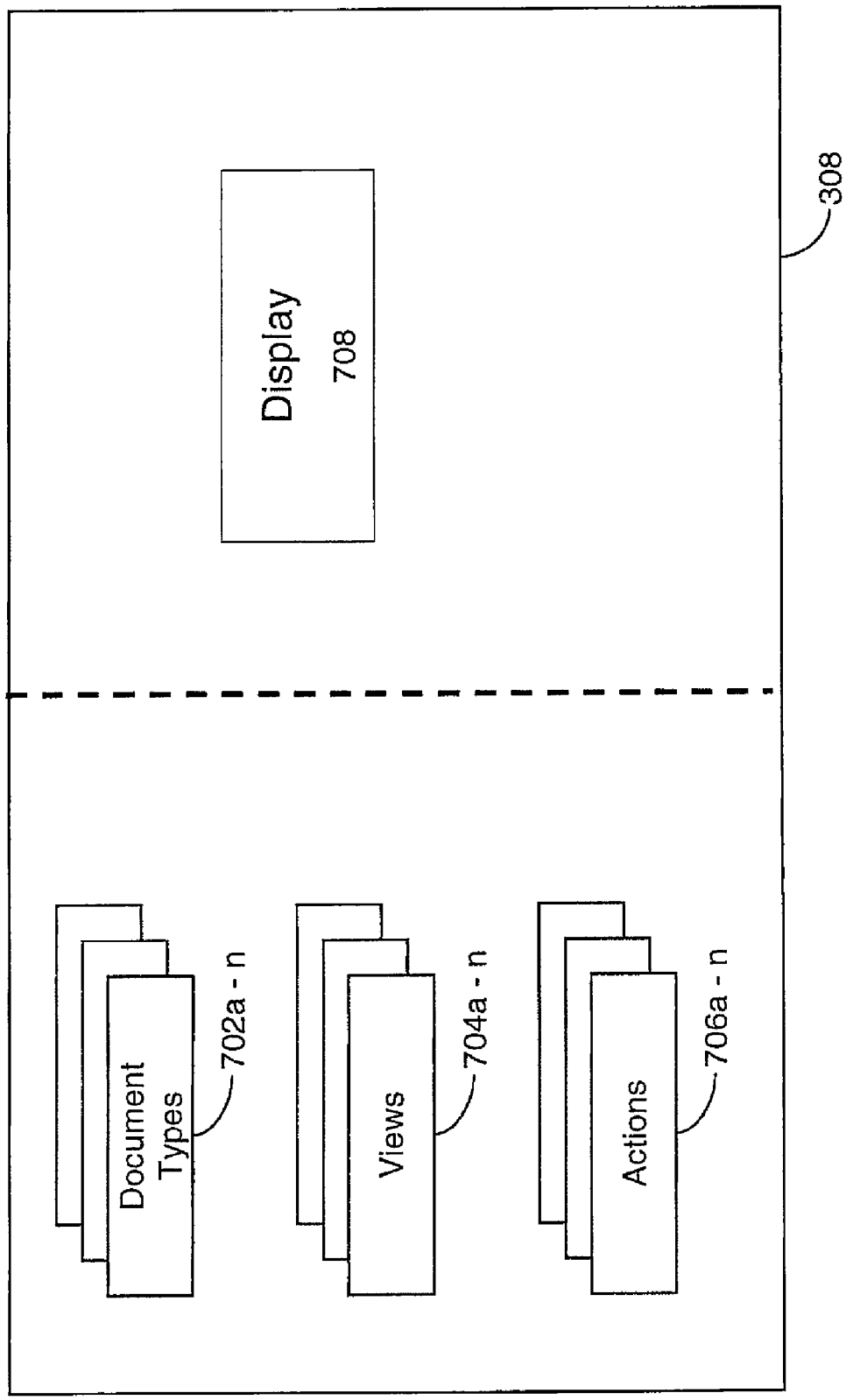
FIG. 7 is an exemplary block diagram of a proposal library according to one aspect of the invention.

Referring to FIG. 7, an exemplary proposal library 308 is provided. Proposal library 308 may be displayed when a proposal manager, proposal delivery team member, or others with appropriate permissions selects proposal library option 308 (see FIG. 3), and may enable proposal managers, users, or others with appropriate permissions to view and manage documents on an enterprise-wide basis. Proposal library 308 may be implemented as a portal, peer-to-peer client, or otherwise, and may include, among other things, options to view, manage, delete, and/or discuss enterprise documents. For example, a set of options 702a-n may provide links to various types of documents. For example, documents may include resumes, submitted proposals, past performance evaluations, proposal sections, exemplary sections, contracts, corporate capabilities, boilerplate language, legal language, templates, cost estimations, abstracts, case studies, corporate images, product shots, off-hours support, building budgets, awards, recommendations, letters of commendation, standard narratives, and/or any other type of document that an enterprise may develop.

In response to selecting one of document types 702a-n, display 708 may be configured to display one or documents of the selected type, and the document may be displayed according to one or more views 704a-n. For example, views 704a-n may include options to view all documents of a document type, view documents in an explorer view, or view documents according to business unit, industry, contract end date, category, vendor, customer, content expiration date, program, proposal, sector, all documents of a document type, and/or other criteria, depending on an organization of an enterprise. View options 704a-n may vary depending on the document type. Moreover, one or more actions 706a-n may be provided to enable manipulation of documents based on appropriate permissions, including but not limited to search, retrieval, modification, reading/writing, etc., depending on the level of permissions and security associated with various documents and data abstractions. Actions 706a-n may include options for setting an alert for a document (e.g., send an e-mail when the document is updated, checked out, expires, etc.), modifying settings (e.g., alter meta information associated with a document), exporting a document (e.g., to a spreadsheet or word-processing program), or other options.

Proposal library 308 may be configured to limit a duration of time that a document is available. For example, pending, active, submitted, or recently closed documents may be available for a temporary period (e.g., for one year after being closed). Moreover, access to a document may be restricted by establishing security or appropriate permissions settings in meta information associated with a document (e.g., by establishing a review team for a document). After the temporary period has expired for a document, the document may be archived and thus made unavailable from proposal manager 304 or proposal library 306, instead requiring searching for the document using archive library 314 (see FIG. 3). This may enable the system to manage data more efficiently and improve performance by offloading older documents, while still maintaining the documents in case they are needed for auditing, intellectual property, or for other reasons. Those skilled in the art will recognize that the duration(s) of time that a document is available in proposal library 308 may be varied without departing from the scope of the invention.

Figure 8:
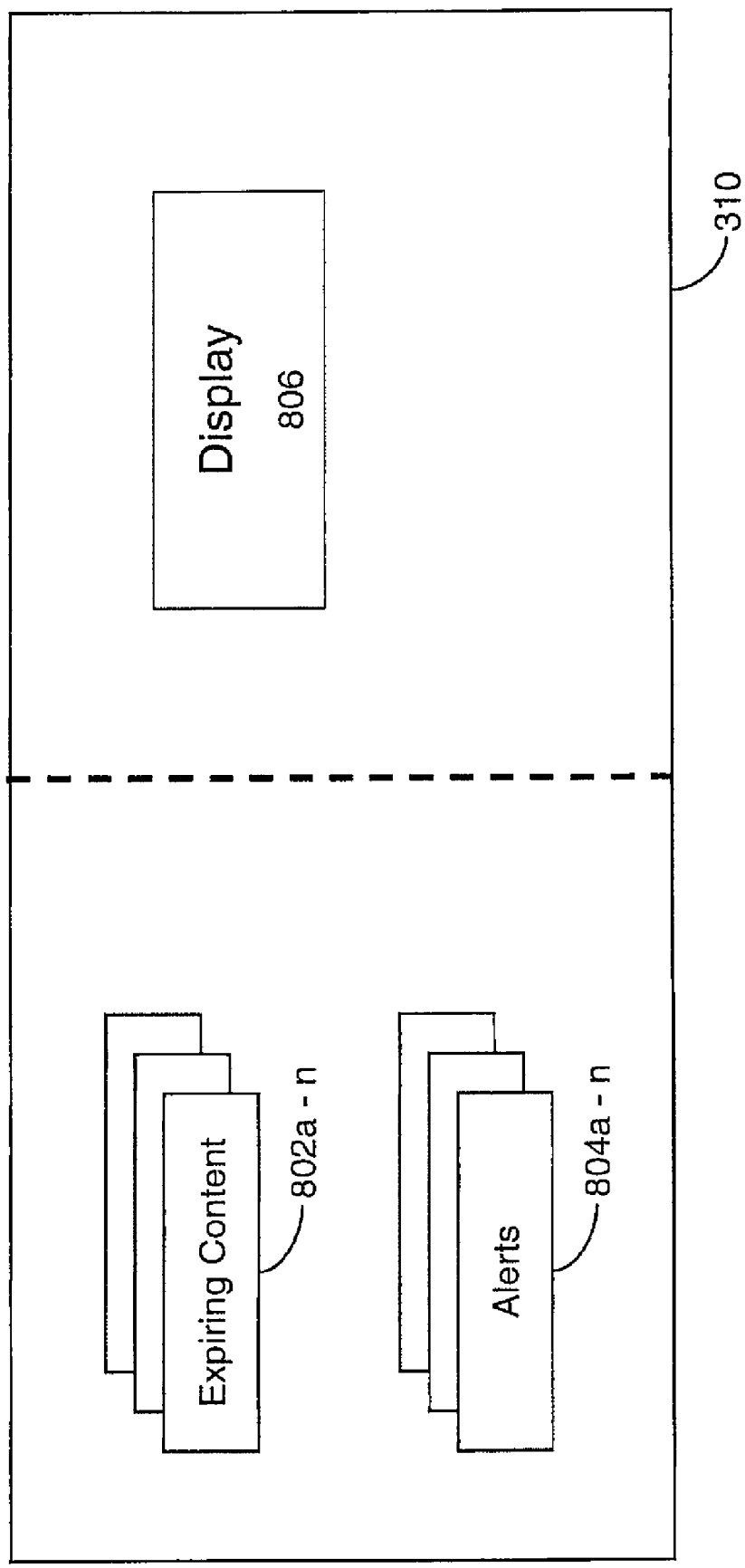
FIG. 8 is an exemplary block diagram of a content health manager according to one aspect of the invention.

Referring to FIG. 8, an exemplary content health manager 310 is provided. Content health manager 310 may be displayed when a proposal manager, proposal delivery team member, or others with appropriate permissions selects content health manager option 310 (see FIG. 3), and may enable proposal manager, proposal delivery team member, or others with appropriate permissions to manage content and ensure that content is up to date. This may be useful, for example, in maintaining personnel records, enterprise records, proposal documents, contracts, and/or other enterprise information, as well as populating reports or evaluating performance (e.g., content health manager 310 may assist in tracking the timeliness of personnel updating their content). Content health manager 310 may be implemented as a portal, peer-to-peer client, or otherwise, and may include, among other things, options to view, manage, and/or update, enterprise documents and/or other content that has expired or is about to expire, in addition to enabling designation of alerts, management teams, or other criteria for keeping content current.

For example, a set of options 802a-n may include options 802a-n to view and/or manage various expiring types of expiring content. For example, expiring content options 802a-n may include options for viewing and/or managing content that will expire within one week, one month, or within another time frame. Expiring content options 802a-n may also include options for viewing and/or managing content that has expired within the last week, month, or within another time frame. Moreover, expiring content options 802a-n may also include options for viewing and/or managing all at-risk content, which may include content that has expired as well as well content that will soon expire.

In response to selecting one of expiring content options 802a-n, display 806 may be configured to display one or content items that fall within the selected option. Each content item may be displayed in a list within display 806, and a title, enterprise library, expiration date, days to expiration and/or days expired, primary contact, secondary contact, and/or other information may be displayed for each content item within the selected option.

An option may be provided to notify the primary and/or secondary contacts, who may then be notified or alerted of the expiring content so that appropriate actions may be taken. For example, alerts options 804a-n may enable a proposal manager, proposal delivery team member, or others with appropriate permissions to select one or more libraries to check for at-risk content, and a form may be provided to send a notification to appropriate personnel, review teams, and/or points of contact. The form may enable the proposal manager, proposal delivery team member, or others with appropriate permissions to generate an e-mail reminder regarding the expiring or expired content. The form may include a field for entering a name or email address, and a field may be provided for a text of the e-mail reminder. Primary and/or secondary points of contact may be assigned for each content item, or on a bulk basis, and an update frequency and/or expiration date may be provided. Thus, content health manager 310 enable an enterprise to keep content information up to date, which may be useful from a human resource perspective, as well as a proposal resources perspective (e.g., to assign personnel to a proposal based on skills, etc.), or for other purposes that will be apparent to those skilled in the art.

Figure 9:
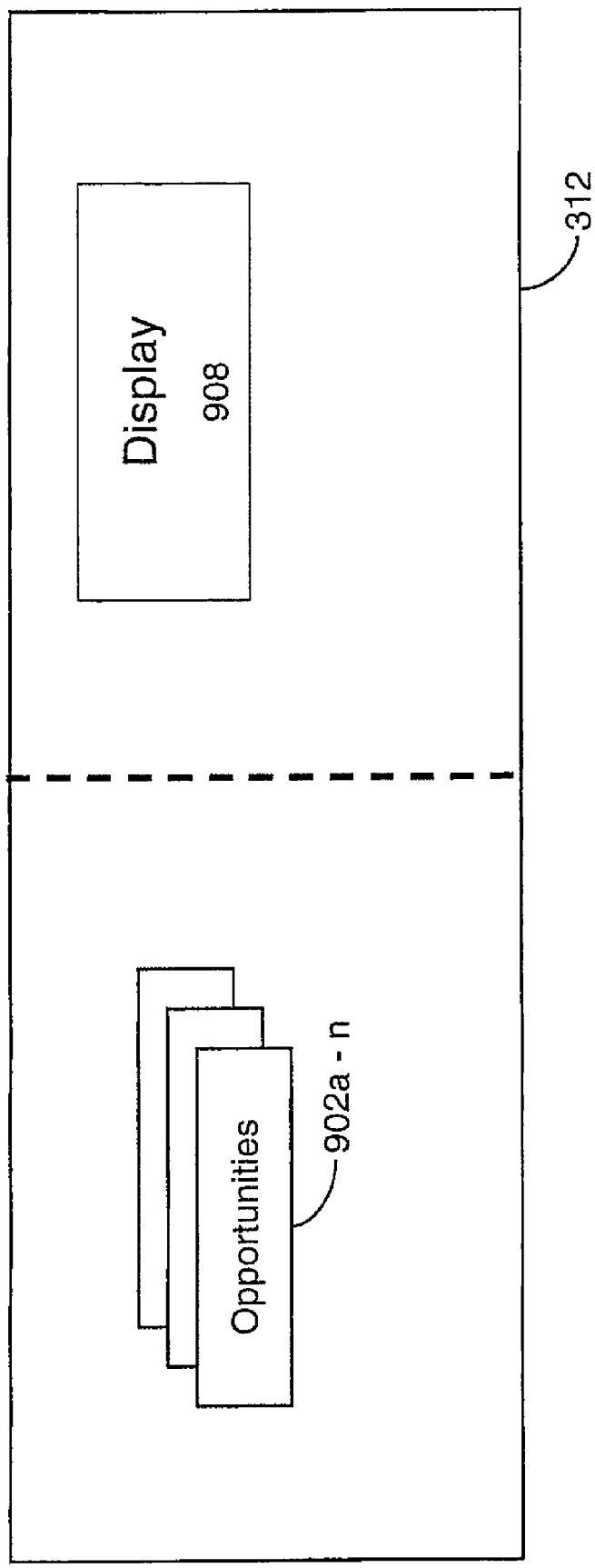
FIG. 9 is an exemplary block diagram of a reports module according to one aspect of the invention.

Referring to FIG. 9, an exemplary reports manager 312 is provided. Reports manager 312 may be displayed when a proposal manager, proposal delivery team member, or others with appropriate permissions selects reports manager option 312 (see FIG. 3), and may enable the proposal manager, proposal delivery team member, or others with appropriate permissions to review past, present, active, and/or anticipated opportunities. Reviewing opportunities may enable development of effective strategies for drafting successful proposals by synergizing best practices, customer requirements, competitor abilities, etc. Reports manager 312 may be implemented as a portal, peer-to-peer client, or otherwise, and may include, among other things, options 902a-n for reviewing, analyzing, and/or updating reports for past, pending, active, and/or anticipated opportunities. For example, opportunities options 902a-n may include one or more of the following: all opportunities, opportunities under consideration, anticipated opportunities, best-and-final-offers, lost opportunities, cancelled opportunities, won opportunities, and/or other categories of opportunities as deemed necessary by an enterprise. The options 902a-n may enable those with appropriate permissions to generate reports according to various criteria, including by business unit, program area, type of opportunity, outcome, or others. Moreover, the reports options 902a-n for past, pending, or other existing proposal opportunities may be linked to a source of the proposal. Thus, when information is retrieved for a specified report that includes a link to a proposal, the information that is returned may be the metadata associated with a data abstraction (i.e., metadata) for the proposal, as well as a link to the proposal document(s) to enable direct access to the relevant information.

Upon selecting a type of opportunity, display 908 may be configured to display a list of opportunities of the selected type, where the list may include one or more of a title, document name, estimated opportunity value, actual opportunity value, opportunity status, due date, program, customer name, and/or other information for each opportunity. Options may be provided within display 908 enabling proposal manager, proposal delivery team member, or others with appropriate permissions to create new opportunity documents, upload opportunity-documents, filter opportunities according to predetermined criteria, export and/or print documents, modify meta information associated with the opportunity documents, or other options.

Figure 10:
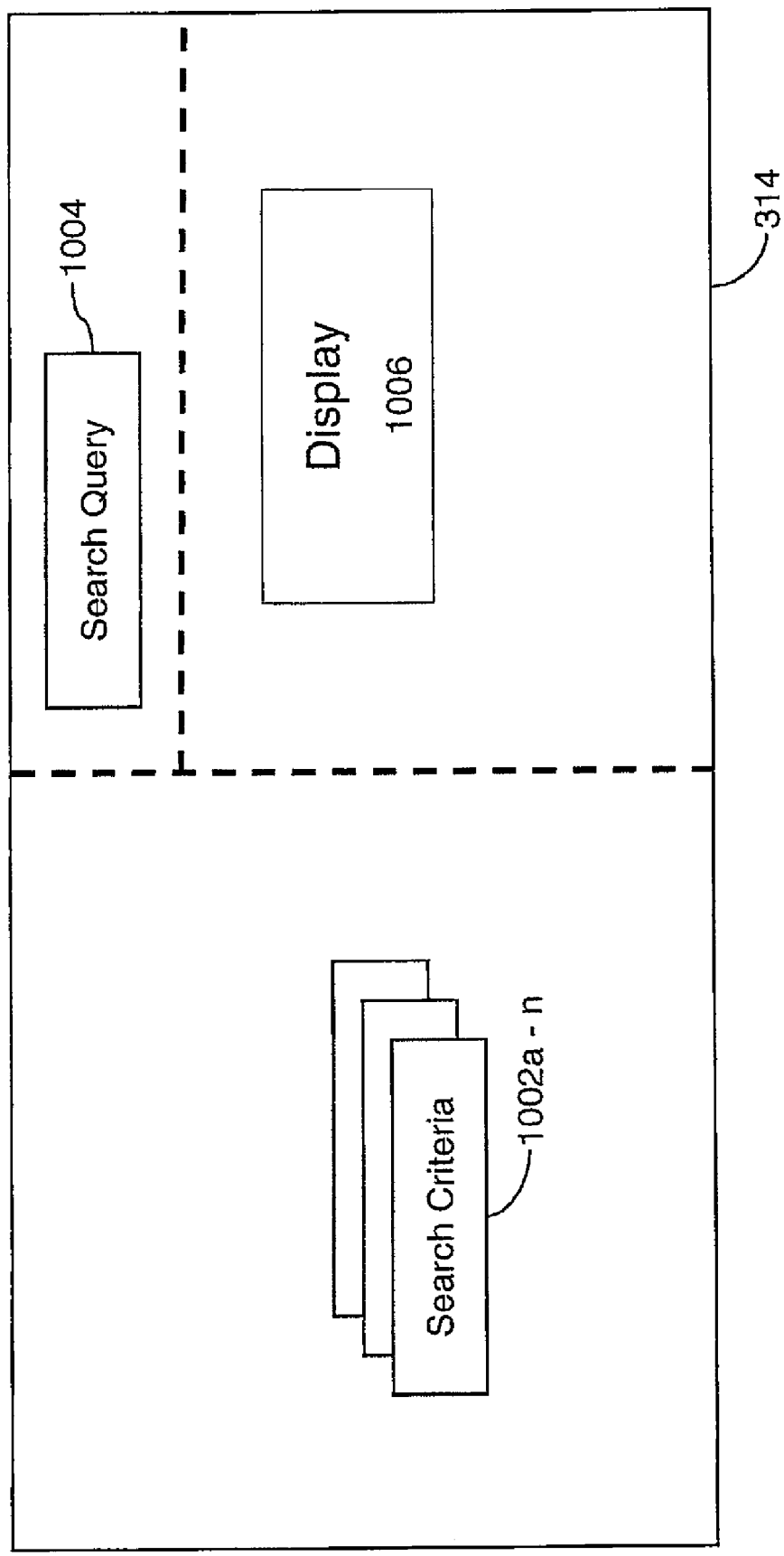
FIG. 10 is an exemplary block diagram of an archive library according to one aspect of the invention.

Referring to FIG. 10, an exemplary archive library 314 is provided. Archive library 314 may be displayed when a proposal manager, proposal delivery team member, or others with appropriate permissions selects archive library option 314 (see FIG. 3), and may enable the proposal manager, proposal delivery team member, or others with appropriate permissions to retrieve closed or otherwise inactive documents that have been closed or inactive for a predetermined amount of time (e.g., over four years). Offloading documents from active data repositories may improve response time, reduce storage requirements, and/or provide other benefits. Moreover, archived documents may be available for auditing enterprise records, maintaining intellectual property, as reference materials, or for other purposes. Archive library 314 may provide options for proposal manager, proposal delivery team member, or others with appropriate permissions to retrieve archived documents according to one or more search criteria 1002a-n, which may include options to search by one or more of the following: opportunity name, client name, start date, end date, submission date, industry, sector, category, business unit, result, proposal manager, writer, sales and marketing executive, vendor, service offering, priority, and/or other criteria.

A display 1006 may include a field 1004 for entering a search query. Upon selecting among search options 1002a-n and entering a query into field 1004, display 1004 may display one or more documents satisfying the search query. Display 1006 may display a list of documents that includes a name, a type, a file size, and/or other information for each document. Display 1006 may also provide options for unarchiving, editing, filtering, organizing, deleting, and/or adding documents to the list. The search options 1002a-n may also allow filtering archived documents according to various predetermined criteria (e.g., the top ten proposal sections, templates, or other documents may be retrieved according to various criteria), or the search options 1002a-n may provide browsing capabilities to retrieve archived documents without requiring a search query.

Figure 11:
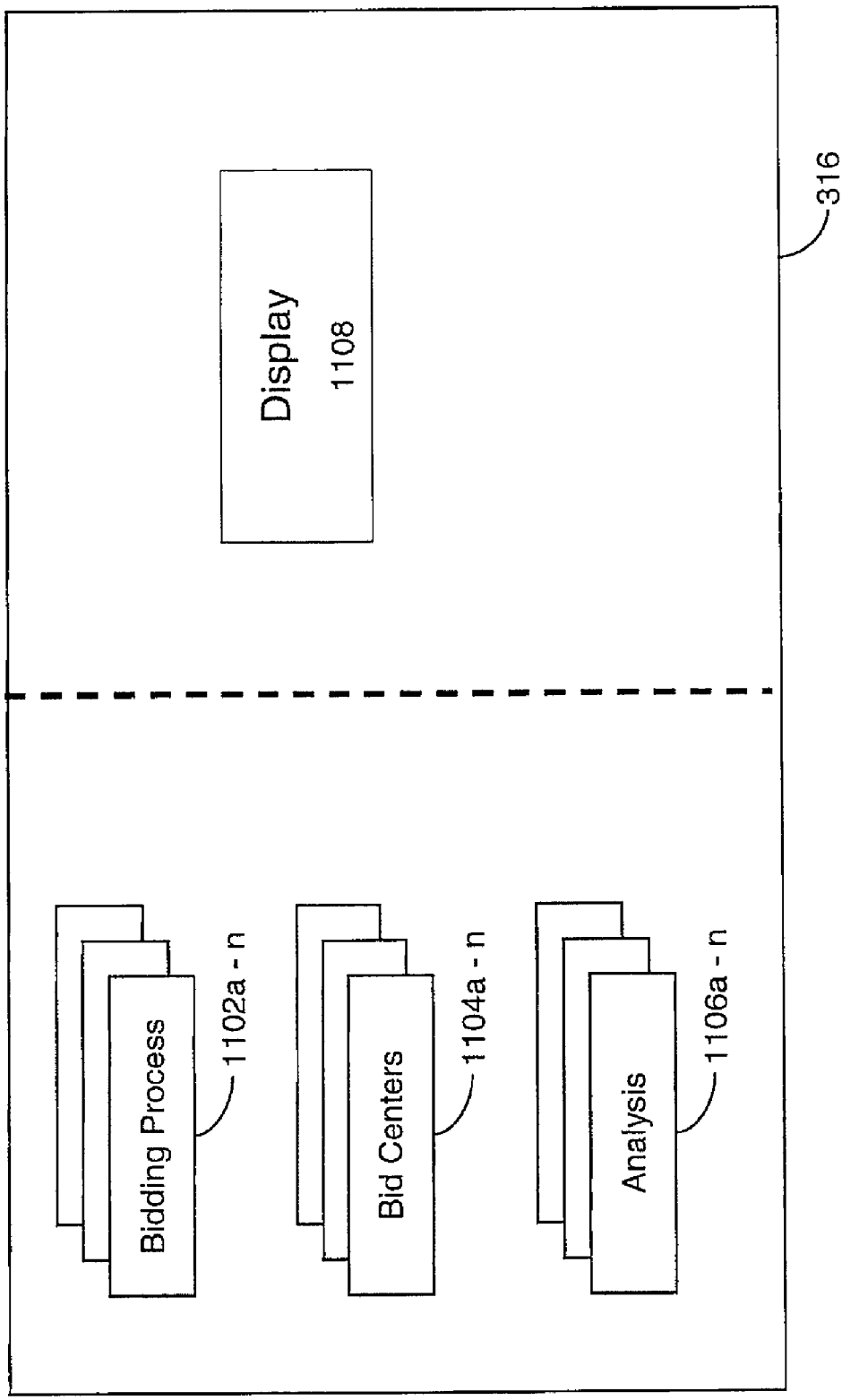
FIG. 11 is an exemplary block diagram of a bid center according to one aspect of the invention.

Referring to FIG. 11, an exemplary bid center 316 is provided. Bid center 314 may be displayed when a proposal manager, proposal delivery team member, or others with appropriate permissions selects bid center option 316 (see FIG. 3), and may enable proposal managers, users, or others with appropriate permissions to develop, monitor, modify, review, and otherwise manage proposal bids. That is, in addition to technical specifications, enterprise qualifications, and other proposal information, an enterprise will often be asked to include a bid amount or other cost estimate for delivering a proposal. Bid center 314 may therefore enable proposal managers or others with appropriate permissions to develop strategic and competitive bids by drawing upon all of an enterprise's resources and information. For example, bid center 314 may enable developing a competitive bid through a bidding process including a series of steps 1102a-n. Moreover, various bid centers 1104a-n may allow viewing past or pending enterprise bids according to specified criteria. Analysis modules 1106a-n may also enable analyzing, reviewing, or otherwise studying past or pending bids in order to identify strengths, weaknesses, competition, or other factors to consider in developing a bidding strategy.

Display 1108 may be configured to initially display views of various enterprise bid resources that may better inform decision-making. For example, display 1108 may include one or more of the following: bids pending approval, recently approved bids, bids under consideration, an enterprise's best performing business development managers, bids for a specific proposal manager, proposal delivery team member, or others to approve, a create new bid form, a bid center search engine, links to frequent tasks, links to assignments, a calendar, a help module, and/or other information. The bids pending approval may include a bid amount or cost estimate associated a proposal, and display 1106 may contain a view of a list of names, due dates, business development managers, and/or other information for pending bids, thus allowing an enterprise to monitor the approval process and ensure that bids are reviewed in time for submission to a customer. Similarly, the list of bids for approval may include a list of pending bids for an approving entity (e.g., the user is a business development manager, proposal manager, proposal delivery team member, or other assigned to a proposal). The list of top business development managers may include the name of one or more business development managers and a number of opportunities that the business development managers have delivered for the enterprise. The list of recently approved bids may include a list of approved opportunities, which may be useful in developing similar bids. Correlatively, strategies may be avoided when the list of approved opportunities includes opportunities that were eventually lost or otherwise deemed less than optimal. The under consideration view may enable retrieving bid opportunities by client, industry, or other criteria. For example, under consideration view may be tied to the bid center search engine, which may include fields for searching by client name, industry, business development manager, or other criteria, and under consideration view may be populated with results of a search entered into the search engine. The create bid center opportunity form may enable to quickly create a new opportunity in a similar manner as provided by bidding process 1102a-n. For example, the create bid center opportunity form may include fields for an opportunity name, solicitation number, due date, business unit, priority, and/or other fields, and upon filling in one or more of the fields and selecting an option to create a new opportunity, bidding process 1102a-n may be launched.

Upon launching bidding process 1102a-n, either creating a new bid center opportunity (as described above) or selecting a create bid option from among options 1102a-n, display 1108 may be configured to display a form for developing a bid center opportunity. For example, in a first step, display 1108 may include one or more of the following fields: an opportunity name, a primary business development point of contact, a customer name, a business unit, a service type, a date a Request for Proposal was issued, and/or additional notes or comments.

In a next step, qualifying questions may be presented to determine if the opportunity is a match for an enterprise based on the solutions, executions, and financial metrics of an enterprise and/or specified in the Request for Proposal. For example, the solution qualifying questions may ask whether the enterprise influenced the requirements, can comply with specifications, and/or offers products and/or services that are competitive and responsive. The execution qualifying questions may ask whether the opportunity is properly funded, the bid is likely to fit within a customer's budget, and/or if there are any terms or conditions requiring attention. Each qualifying question may be assigned a relative weight, and an option may be provided for entering additional notes related to each question.

In a next step, strategic questions may be presented to determine if the enterprise is in a competitive position to win the bid. For example, strategic questions may include customer-relationship questions that ask whether the enterprise has met with the Request for Proposal customer previously, and if so, how many times, whether the enterprise has a positive history or relationship with the customer, whether the enterprise has internal personnel especially qualified to work with the customer, whether the enterprise controls the account, and/or whether competitors have an executive or political advantage. The strategic questions may also include competitive position questions that ask whether the enterprise has a unique and compelling advantage, whether the Request for Proposal is free of competitor requirements, whether the enterprise is an incumbent, whether the customer has expressed dissatisfaction with competitors, whether the enterprise pre-sold similar products or services, and/or whether the enterprise has sufficient experience, qualifications, and/or references to qualify. Each strategic question may be assigned a relative weight, and an option may be provided to enter additional notes related to each question.

After bid process 1102a-n is completed and a new bid opportunity created, the answers to the qualifying and/or strategic questions and the relative weights may be correlated to generate a win score denoting a likelihood of the enterprise winning the proposal. An option may be provided to submit the bid opportunity to a bid board, where bid centers 1004a-n may provide a bid board manager option to assign one or more bid boards to a bid (e.g., based on business unit, for all opportunities, or according to other criteria). For example, a bid board may be created for a specific business unit (e.g., Managed Services), and a new bid center opportunity with the business unit may be submitted to the bid board for the business unit. Bid board manager option may include one or more fields for names, e-mail addresses, a business unit, or other information relating to a bid board manager. Options may be provided to create new business units and/or to add additional board members.

Bid centers 1104a-n may also provide options to view bid center reports according to business unit, business development manager, or other criteria. For example, upon selecting a bid center report, display 1108 may include a list of opportunity names, business development points of contact, bid status, business units, bid scores, operations points of contact, proposals points of contact, evaluation dates, and/or other information for each bid within the selected bid center.

Analysis modules 1106a-n may provide one or more modules for increasing proposal win rates or following most valuable leads by identifying best practices or strategies for winning bids. For example, analysis modules 1006a-n may include a module for establishing one or more issues to consider in developing a bid and assigning relative weights and scores to each issue. The issues and weights may be incorporated into the qualifying and/or strategic questions (discussed above) in order to better refine the process by which bids are created. Analysis modules 1106a-n may also include an option to load winning profile histories, such as entering information relating to a won proposal that may be useful in developing later bids.

Figure 12:
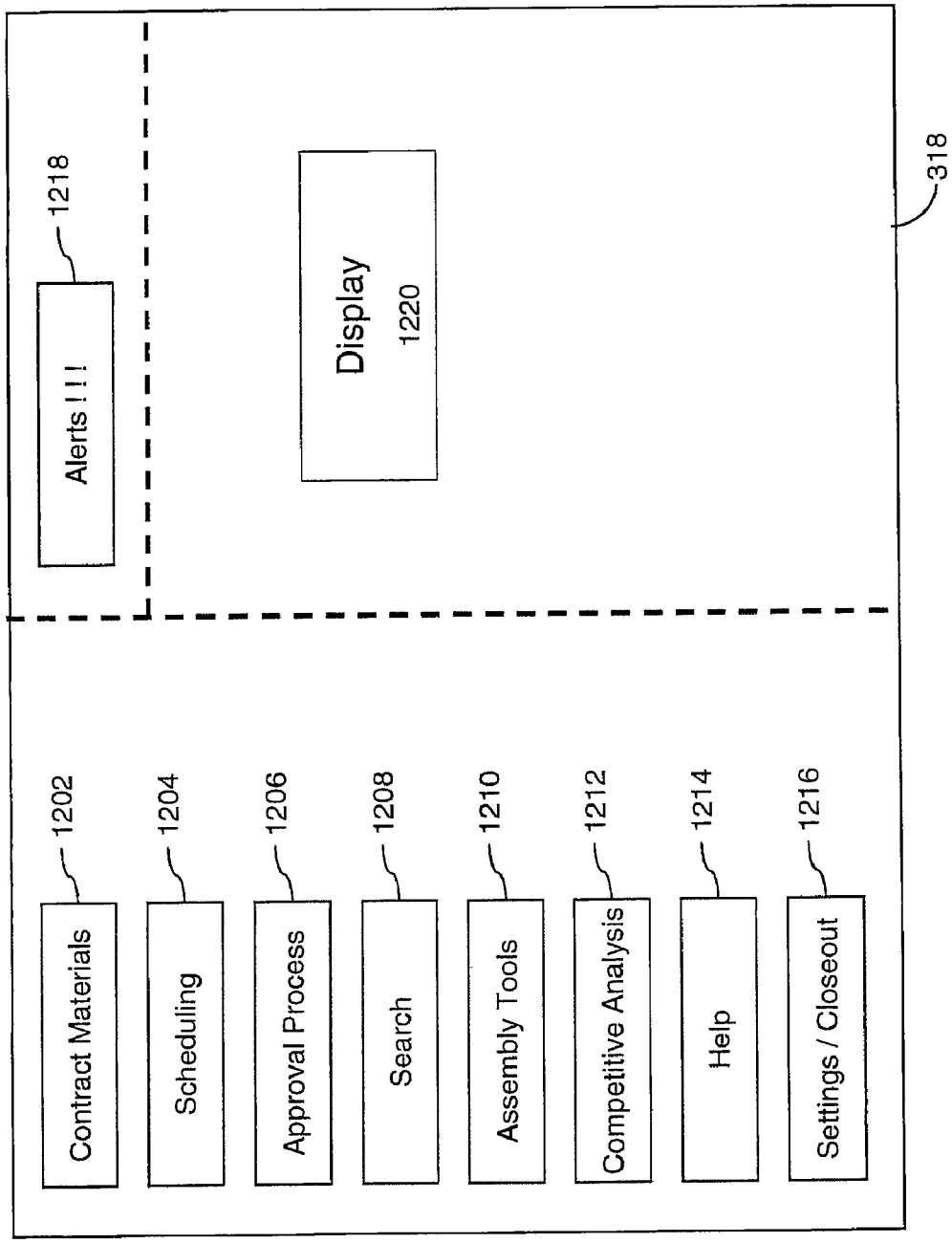
FIG. 12 is an exemplary block diagram of a contracts manager according to one aspect of the invention.

Referring to FIG. 12, an exemplary contracts manager 318 is provided. Contracts manager 318 may be displayed when a contract manager, contract delivery team member, or others with appropriate permissions selects contract management option 318 (see FIG. 3), and may enable the contract manager, contract delivery team member, or others with appropriate permissions to manage contracts over their entire life cycle. For example, when a proposal is won, the proposal may mature into a contract, thus necessitating compliance with scheduling, financing, execution, and/or other issues while the contract is fulfilled and the subject of the proposal delivered. Contracts manager 318 may include, among other things, a contract materials option 1202, a scheduling option 1204, a contacts option 1206, a search tools option 1208, an assembly tools option 1210, a competitive analysis option 1212, a help option 1214, a settings option 1216, one or more alerts 1218 (e.g., to provide notifications of changes to a contract or to provide notification of other important information), and/or a display 1220.

Upon selecting contracts manager 318, display 1220 may be configured to initially display one or more of the following: a list of contracts pending approval, contract expiration alerts, a contract manager's or team member's assigned contracts, a contracts dashboard, a tool to create a new contract, a tool to look up prior contracts and/or prior contract information. One or more tasks and/or calendar tools may also be displayed. Upon selecting a specific contract, display 1220 may be display a contract summary and/or status. For example, the contract summary may include, among other things, a contract name, a contract description, a contract manager, a business unit, a solicitation number, a website reference, a contract type, a contract source, a contract coordinator, a charge code, a current budget spent, a due date, a percentage completed, a contract status, a contract phase, a risk category, an active review team, notes, attachments, or other information. The contract summary may also include a dashboard for managers (review teams) to review the contract and/or sign critical documents, a task status indicating personnel assigned to tasks, due dates, descriptions of the tasks, a user-specific task summary, or other information. In some implementations, display 1220 may include one or more alerts 1218 that may provide notifications of pending deadlines, overdue tasks, updates to a contract (e.g., when a final legal review is rescheduled), or other alerts. Alerts 1218 may be displayed persistently until necessary actions have been taken to clear the alerts 1218.

According to one aspect of the invention, displayed contract data may be edited by selecting settings options 1216. When a contract manager, contract delivery team member, or others with appropriate permissions selects settings option 1216, display 1220 may be configured to display options for editing any or all of the contract data. The contract data (e.g., stored in data repository layer 210 of FIG. 2) may then be updated to reflect changes. Editing contract data may include editing one or more aspects of the contract summary, including the contract name, status, review team, or other aspects of the contract.

Settings option 1216 may also provide options to close out a contract. When a contract manager, contract delivery team member, or others with appropriate permissions elects to close-out the contract, display 1220 may be configured to provide options (e.g., a menu including a series of steps) to close-out the contract. These options (or steps) may include one or more of collecting final metrics, uploading completed contracts, entering additional notes and surveys, and finalizing closing the contract.

When the contract manager, contract delivery team member, or others with appropriate permissions elect to collect final metrics, display 1220 may provide options to enter information regarding the contract that can provide useful metrics. The information may include, among things, one or more of the following: a contract name, a contract number, a completed date, a contract start date, a contract end date, a contract type, an auto-renewal option, a send expiration email addressee(s) and/or date, and/or a total hours charged.

When the contract manager, contract delivery team member, or others with appropriate permissions elect to upload completed contract information, display 1220 may provide options to upload some or all of the complete submitted materials and/or other relevant documents. By way of example, display 1220 may include options for uploading final contracts or additional materials in their entirety. When the contract manager, contract delivery team member, or others with appropriate permissions elect to upload contract sections individually, display 1220 may display options for uploading sections of a contract or contract document, where a library in which to store the contract section may be selected, a subject matter expert and/or team member associated with the contract section may be selected, and/or an option to designate the contract section as a best practice candidate may be selected.

When the contract manager, contract delivery team member, or others with appropriate permissions elects to enter additional notes, display 1220 may present options for adding additional notes or other materials. In response, additional notes may be entered into a notes dialog and/or select additional documents to be attached. When all desired selections have been entered, the notes and/or additional document information may be saved or an option to close-out the contract may be selected. An option may be provided to send the closeout survey to a contract team or review team. After completing the additional notes and/or feedback survey, a confirmation may be provided that the contract has been closed, and information may be presented describing an availability of information and/or documents relating to the closed contract. For example, the contract may be set to an inactive state, where the contract may be accessed by searching a library. Further, inactive contracts may have access limited to personnel that had access to the contract while it was active, and the contract may be excluded from searches to improve the response time of the searches. The contract may be moved to an archive data repository after an extended length of time (e.g., after four years), at which time the contract may be accessed through an archive library.

Contracts manager 318 may include a contract materials option 1202, where upon a contract manager, contract delivery team member, or others with appropriate permissions selecting contract materials option 1202, display 1220 may be configured to display one or more of the following: key themes and notes, external vendors materials, one or more assignments, contract materials, supporting images, production contracts, and/or other materials related to a contract. Key themes and notes may include a form for specifying one or more talking points or key issues relating to a contract as well as a field for specifying a priority for the talking points or issues. Key issues may include important factors during the delivery or fulfillment of a contract, key dates, etc., which may be to develop strategies and schedules for future contracts. Assignments may include one or more tasks relating to creating or executing the contract, personnel or team members assigned to a task, a task status, a task priority, a due date, a percentage complete, or other information. External vendor materials may include one or more documents provided by partners, vendors, and/or sub-contractors collaborating on a contract. Assignments may be integrated into a calendar program or other scheduling program. Contract materials may include one or more documents included in a contract (e.g., addendums, cover sheets, etc.), one or more documents to be used as references when drafting the contract, or other documents. Supporting images may include one or more images that can be incorporated into a document or contract (e.g., as clip-art). Production contracts may include a finalized document reflecting a finalized contract, and a production contract may include a synthesis of one or more other documents, images, or other information. Production contracts may be submitted to a customer for finalizing an engagement to deliver a product or service relating to a Request for Proposal. Each document may include writers or personnel associated with the document, a checked in/checked out status, an assigned writer or personnel, a last modified date, a due date, versions, or other information associated with the document.

Contract manager 318 may include a scheduling option 1204, where upon a contract manager, contract delivery team member, or others with appropriate permissions selecting scheduling option 1204, display 1220 may be configured to display one or more of the following for a contract: a milestone calendar, an assignment calendar, and/or other scheduling information or calendars. A milestone calendar for a contract may display contract milestones in a monthly view, daily view, list view, user-specific view, or other views. Contract milestone calendars may enable contract managers or others with appropriate permissions to schedule various benchmarks to ensure that the contract is delivered on time and in compliance with specifications. Similarly, contract assignment calendars may display team and/or team member tasks for a contract, and contract assignment calendars may display assignments in a monthly view, daily view, list view, user-specific view, or other view. An option may be provided to create a new task by specifying a task title, priority, status, percentage complete, assignee, description, start date, due date, or other information. An option may also be provided to attach or otherwise associate one or more documents, files, or other items to a task. Moreover, contract milestone calendar and/or contract assignment calendar may be further configured to integrate with existing systems to simplify access (e.g., tasks and/or milestones may be displayed in Microsoft Outlook®). The contract milestone and/or assignment calendar may be configured to display one or more alerts 1218 in order to provide contract managers, contract delivery team members, or others with appropriate permissions with alerts of approaching or overdue deadlines, or other scheduling related alerts. New milestones may be created by specifying a milestone title, begin date, end date, description, location, recurrence frequency, or other information. A workspace may be created for the new milestone that may enable organization of attendees to virtual meetings, collaborative agenda setting, document and minutes sharing, and/or other details for an event or milestone.

Contract manager 318 may include an approval process option 1206, which may enable defining or managing an approval process to facilitate and/or enforce procedures relating to the process for approving certain actions, such as contract approval. By way of example, approval process 1206 may include options for a contract manager, contract delivery team member, or others with appropriate permissions to manage aspects of a required signatures component of the process, to create a new review process and/or to manage a process.

When the contract manager, contract delivery team member, or others with appropriate permissions elect to manage required signatures, display 1220 may present options for selecting or change an approval process name. For a selected process, display 1220 may display, among other things, one or more of the following: one or more names (or roles) from which a signature is required, an order in which one or more required signatures are to be obtained, a due date for the signature, and a status indicator (e.g., if the person approved or took some other action, a date on which an action occurred and/or other information relating to the approval process). Options to add and/or edit information may be displayed to enable the user to add and/or edit displayed information.

When the contract manager, contract delivery team member, or others with appropriate permissions elect to create a new approval process, display 1220 may present options to enable a contract manager, contract delivery team member, or others with appropriate permissions to create a new approval process. By way of example, display 1220 may display, among other things, one or more of the following: an option to specify a name for the process, add individuals (e.g., team members or others with appropriate permissions) or roles, an order in which the signatures are required, a date by which the signature (or other action) is required, notes/comments, and/or other information related to an approval process. Display 1220 may give the user options to add, edit, and/or delete the entered information. Once the user has finished specifying this information the user can select a save (or similar) option to cause the process to be stored for later use.

When the contract manager, contract delivery team member, or others with appropriate permissions elect to manage review processes, display 1220 may display, among other things, one or more of the following: a name of one or more approval processes, an option to select one or more approval processes to be managed, an approval process status, an option to change the approval process status, notes/comments related to the approval process, an option to save entries associated with changes made to an approval process, and/or other information relating to managing an approval process. Status information may include ah option to make an approval process active or inactive.

Upon a contract manager, contract delivery team member, or others with appropriate permissions selecting search tools option 1208, display 1220 may be configured to display options to search one or more of the following: a complete library, a contract library, a contract template library, submitted contracts, archives, similar contracts, and/or previously used sections, among other things. One or more library or sub-library options may be presented to the user, and options to search by vendor may also be provided. The contract manager, contract delivery team member, or others with appropriate permissions may select one or more libraries, folders, and/or terms to search for. For example, a contract manager, contract delivery team member, or others with appropriate permissions may specify to search for contracts within a specific business unit that include a search term.

Upon a contract manager, contract delivery team member, or others with appropriate permissions selecting assembly tools option 1210, display 1220 may be configured to display one or more of the following relating to assembling a contract: a clause library and/or a template library. Further, tools may be provided to generate contracts and/or merge selected contract materials (e.g., selected from clause or template libraries). The contract generator may enable contract generation by selecting one or more templates and/or clauses, such as license agreements, asset purchase agreements, indemnification agreements, business separation, consulting agreements, manufacturing agreements, organizational charts, subcontracting limitations, public policy statements, reporting structures and guidelines, corporate performance specifications, or other contract materials. The contract generator may allow the contract manager, contract delivery team member, or others with appropriate permissions to specify an order of the contract materials, provide a name and storage location for a merged document, or other information.

Upon a contract manager, contract delivery team member, or others with appropriate permissions selecting competitive analysis option 1212, display 1220 may be configured to display one or more of the following related to a specific customer or competitor: one or more current contract teams (e.g., contract teams working to deliver a contract for the customer), one or more subject matter experts, previous approvers, and/or previous writers (e.g., subject matter experts and/or contract writers and their respective roles for a contract). When the contract manager, contract delivery team member, or others with appropriate permissions select the previous approvers option, information regarding the contract and its approval may be displayed, including individuals who approved the contract and information related thereto. When the contract manager, contract delivery team member, or others with appropriate permissions select the contract writers option, information regarding individuals who participated in the writing of the contract and/or portions thereof may be displayed. Display 1220 may also include names of subject matter experts, their roles/expertise, and contract names for which they have previously participated. A link to the persons, bio, contacts, prior documents and/or other information may also be displayed to enable the contract manager, contract delivery team member, or others with appropriate permissions easy access to such information for experts of interest.

Upon a contract manager, contract delivery team member, or others with appropriate permissions selecting settings option 1216, display 1220 may be configured to display, among other things, options for the use to select one or more tools relating to the following: a contract summary, alert management, a current contract team, permissions, team setup, review teams, virtual meetings, vendors, and/or contract close-outs, among others. When the contract manager, contract delivery team member, or others with appropriate permissions selects the contract summary tool, display 1220 may present options for selecting, adding, editing, and/or deleting information relating to the contract name, type, description, source, coordinator, manager, business unit, charge code, current budget spent, due date, percentage complete, required signatures, contract status, risk category, notes/comments, and/or attachments, among other things.

When the contract manager, contract delivery team member, or others with appropriate permissions selects alert management, a tool may be provided to specify an alert title, message, status (e.g., informational or action-item), duration, alert type, notification method (e.g., site-wide or via e-mail), alert recipient, or other alert information. Upon selecting the current contract team tool, options may be provided to view a team for a contract. A contract team may include personnel names, roles, affiliations (e.g., companies, divisions, etc.), and/or contact information to enable collaboration between team members. The team setup tool may enable contract manager, contract delivery team member, or others with appropriate permissions to modify any or all contract team members. The permissions tool may enable setting security measures for a contract (e.g., by selecting one or more personnel to have full, read-only, and/or restricted access to a collaborative contract area). The virtual meeting tool may provide options to create or edit meetings, as well as to review (e.g., debrief or compile minutes for) completed meetings. Virtual meetings may be integrated with scheduling tools 1204 to provide notifications and/or reminders to team members regarding a meeting, and virtual meetings may enable remote collaboration, collaboration between different enterprises, or other benefits.

Contracts manager 318 may be reconfigured, or similar management modules may be created, for different types of contracts. For example, some enterprises may enter into contracts with Indefinite Delivery and Indefinite Quantity specifications. For Indefinite Quantity Indefinite Delivery contracts, display 1220 may also include dashboards for active Indefinite Quantity Indefinite Delivery contracts, including a current phase and task for the contract. Display 1220 may also include Indefinite Quantity Indefinite Delivery evaluations, partners, content health, review teams, etc., as it may be particularly important that in-process review of an Indefinite Quantity Indefinite Delivery is simple and streamlined. For example, if a vendor continues to fall short, thereby disrupting a supply chain, the enterprise may hire a new vendor to ensure that delivery requirements can be met over the life of the contract. Similarly, options 1202-1216 may also include options to broadcast tasks, define partner skills matrices, view Indefinite Quantity Indefinite Delivery reports, review past performance, view contract performance, evaluate remaining Indefinite Quantity Indefinite Delivery funds, evaluate partners, etc. Options 1202-1216 and display 1220 may be therefore be modified to meet specific needs of unique contract types.

Referring to FIG. 13, an exemplary resume manager 320 according to one aspect of the invention is provided. Resume manager 320 may be displayed when a resume manager or others with appropriate permissions select resume manager 320 (see FIG. 3), for example, and may enable contract managers, human resource managers, or others with appropriate permissions to manage personnel related information. Resume manager 320 may include, among other things, one or more employee management options 1302a-n, one or more proxy management options 1304a-n, a search engine 1306, a content health manager 1308, and/or a reports options 1309.

Display 1310 may be configured to initially display views of commonly referenced resume information. For example, display 1310 may initially include one or more of the following: one or more resume workloads, a resume and proxy summary, links to frequently used tasks, links to upcoming tasks, or other things. The resume workloads may include a resume name (e.g., a name of an employee, client, or vendor), a due date (e.g., expiration date or evaluation date), and/or a next approver (e.g., a person within an enterprise responsible for meeting the due date). The resume and proxy summary may include a total number of resumes within the resume workload and/or a total number of proxies associated with the resumes. The links to frequently used tasks may include one or more of the following options: add a resume, assign a proxy, search resumes by education, search resumes by work experience, email a page, search resumes, change resume profile, or other tasks. Many of the tasks within the frequently used tasks may be similar, overlap with, or the same as employee management options 1302a-n, proxy management options 1304a-n, search engine 1306, and/or content manager 1308.

Upon a resume manager or others with appropriate permissions selecting one of employee management options 1302a-n, display 1310 may be configured to display options and functions for managing the respective option. For example, in one implementation, one of employee management options 1302a-n may enable a proposal manager to review proposal efforts, including personnel assigned to the proposal efforts. An employee may be associated with a resume, and display 1310 may display the employee's name, specialty, and/or focus, as well as a last modified date. Options 1302a-n may include an add resume tool, where an employee, a description, and a resume document may be uploaded to add the resume to the system. Tools may be provided to build employee profiles, which may be useful in identifying subject matter experts, education qualifications, or other information for assigning employees to personnel, as well as for recruiting, marketing, and evaluation of personnel. For example, an employee profile may include one or more of an employee name, an employee identifier, a subject matter expert qualification, educational background, certifications and licenses, work experience, years of experience, military experience, proposals supported, customers supported (e.g., customers associated with proposals the employee supported), publications, professional associations, or other information. An employee profile may also define a role for the employee (e.g., administrator, business development, and/or user).

Upon a resume manager or others with appropriate permissions selecting one of proxy management options 1304a-n, display 1310 may be configured to display options and functions for managing the respective proxy option. For example, in one implementation, one or more employees may be assigned as proxies for other employees. This may enable an enterprise to plan for possible downtime by reassigning an employee's task to their proxies. Proxies may be selected based on similar educational backgrounds, subject matter expertise, proposals and/or customers supported, or other factors. Tools may be provided to manage proxy relationships, including adding, modifying, or deleting proxies for one or more employees. An option may be provided to notify employees and their proxies when their profiles and/or proxy lists are changed.

Upon a resume manager or others with appropriate permissions selecting search engine 1306, display 1310 may be configured to display options for searching for employees, resumes, or other personnel related information. The search engine may include one or more fields for narrowing a search query, where the fields may include one or more of the following: a job title, a job family, an organization, a department, a state, an office (or location code), a city, a zip code, a region, an employee status, a hire date, an education background, a language proficiency, a certification or license, a previous employer, customers supported, military experience, a skill, a security clearance, or other criteria. Thus, proposal managers or others with appropriate permissions may locate specific employees or personnel to support a task based on specific qualifications for the task, thereby bridging the gap between human resource systems and project delivery systems.

Upon a resume manager or others with appropriate permissions selecting a content manager 1308, display 1310 may be configured to display options for assigning resume profiles, troubleshooting resumes, updating resumes, or other things. For example, an option may enable assigning e-mail notifications for resumes (e.g., send an e-mail to a manager or user when a resume is updated). In another implementation, a troubleshooter may identify resumes that do not have an e-mail address associated with it, and a user may be prompted to take corrective action. In another implementation, content manager 1308 may be configured to expire a resume after one year to ensure that employee profiles are current. Thus, content manager 1308 may provide notification of expired resumes or resumes that will expire within a day, week, month, or other length of time. Resume managers or others with appropriate permissions may generate various reports or otherwise collate employee information using reports option 1309, where the reports may assist in evaluating team members or other personnel for various tasks. Moreover, the generated reports may be fully customizable, such that an enterprise can create detailed reports depending on the enterprise's own unique needs.

Those skilled in the art will recognize that the system described above may be modified in many ways to meet the unique needs of an enterprise. In particular, an enterprise may have a distinct set of business units or data analysis requirements, such that specific document types may be created for a business unit and metadata used to describe various documents may be modified to include data or fields that are relevant for an enterprise's information management needs. Moreover, client access points and user interfaces may be modified to reflect the configurable aspects of the system. For example, an enterprise may elect to emphasize post-process reviews of proposals, contracts, bids, or other aspects of enterprise management. In such a case, it may be desirable to include additional meta fields for documents that reflect debriefing questions and answers, and/or an additional module may be provided for managing debriefing. The debriefing module may be configured to display debrief dashboards for proposals, contracts, etc., as well as win profiles across business units, frequent tasks, debrief phases, or other information. Debriefing may include deconstructing opportunities within an enterprise. For example, a proposal may be deconstructed to identify the proposal's name, description, manager, number, type, source, coordinator, charge code, budget, submit date, win/loss result, and/or additional notes. A debrief team may be created to analyze the information to enhance future proposal submissions or optimize enterprise performance, and debriefing sessions may be integrated into a calendaring module to assist in scheduling enterprise tasks and deadlines. In one implementation, a debriefing questionnaire may prompt a debriefer, or others with appropriate permissions to enter "Shall" statements indicating requirements specified in a Request for Proposal. The "Shall" statements may be assigned relative priorities and a field may be included for the debriefer to specify how the enterprise was able to respond to the "Shall" statements. The debriefing questionnaire may also prompt the debriefer to specify how competitors responded to the "Shall" statements in order to identify win themes and differentiating characteristics. In another implementation, competitor opportunities (e.g., similar opportunities that the enterprise was uninvolved with) may be deconstructed to identify relevant win themes for informing proposal development within the enterprise. For example, the enterprise may retrieve competitor responses to "Shall"

statements by filing Freedom of Information Act requests and responses to "Shall" statements may be entered and may be integrated with customer relationship management systems to refine customer/competitor intelligence (e.g., FIG. 1, element 115c).

Those skilled in the art will recognize additional enhancements and configurations. As such, the proposal management system may be modified to include additional documents, tasks, and/or other features, and meta fields may be included to describe any number of data abstractions as would be necessary to meet all the needs of managing an enterprise. Therefore, while the above disclosure has been described in terms of specific exemplary aspects, implementations, and embodiments of the invention, those skilled in the art will recognize various changes and modifications that may be made without departing from the scope and spirit of the invention. Therefore, the specification and drawings are to be regarded as exemplary only, and the scope of the invention is to be determined solely by the appended claims.

What is claimed is:

1. A method for managing proposal related tasks and proposal related data for an entity using an enterprise proposal management system, wherein the proposal related tasks include one or more tasks for managing a proposal lifecycle and the proposal related data include data stored in one or more data repositories derived from one or more of past, present, or anticipated proposal opportunities, the method comprising:

receiving information describing a proposal opportunity that includes a solicitation for one or more bids at the enterprise proposal management system;

developing business strategies for the proposal opportunity using the data stored in the data repositories, wherein developing the business strategies includes:
providing information relating to whether the entity should pursue the proposal opportunity;
storing the information describing the proposal opportunity in the data repositories as a data abstraction associated with the proposal opportunity; and
generating a win theme associated with the proposal opportunity based on the information describing the proposal opportunity, wherein the win theme compares relative strengths associated with the entity and one or more competitors having abilities to respond to key issues associated with the proposal opportunity;

developing a proposal to be submitted in response to the solicitation if the entity pursues the proposal opportunity based on the developed business strategies, wherein developing the proposal includes:
developing a bid amount or cost estimate associated with the entity delivering the proposal using the enterprise proposal management system and the data stored in the data repositories, wherein the enterprise proposal management system launches a bidding process that displays one or more forms to develop the bid amount or cost estimate associated with the entity delivering the proposal; and
generating a score denoting a likelihood that the developed bid amount or cost estimate will result in the entity winning the proposal;

controlling delivery of the proposal if the entity wins the proposal, wherein controlling delivery of the proposal includes interacting with the data stored in the data repositories to coordinate one or more areas associated with the entity delivering the proposal; and
automatically updating the data abstraction stored in the data repositories to include information relating to one or more of the developed business strategies, the developed proposal, or the delivery of the proposal.

2. The method of claim 1, further comprising:
receiving a request relating to one or more of the proposal opportunity or the proposal at the enterprise proposal management system;
communicating information relating to the request to a first service layer associated with the enterprise proposal management system, wherein the first service layer includes one or more services to manage the proposal related tasks and the proposal related data;
communicating the information relating to the request from the first service layer to a second service layer associated with the enterprise proposal management system, wherein the second service layer includes at least one data service and at least one document service to manage the proposal related tasks and the proposal related data; and
communicating the information relating to the request from the second service layer to the data repositories to automatically update the data stored in the data repositories to include the information relating to the request.

3. The method of claim 1, wherein the data repositories include at least one operational data repository and at least one data warehouse, wherein the data stored in the data repositories includes information relating to at least one of an enterprise resource planning system or a customer relationship management system associated with the entity.

4. The method of claim 3, wherein the data stored in the data repositories further includes one or more data abstractions having one or more metadata fields associated with one or more proposals, contracts, resumes, debriefings, projects, or documents.

5. The method of claim 1, wherein developing the business strategies further includes:
updating the data abstraction associated with the proposal opportunity to include the win theme.

6. The method of claim 5, wherein developing the proposal further includes displaying or updating information relating to at least one of the data abstraction associated with the proposal opportunity, one or more documents associated with developing the proposal, or one or more tasks associated with developing the proposal.

7. The method of claim 1, further comprising closing the proposal based on an outcome of the proposal, wherein closing the proposal includes:
receiving information summarizing one or more issues that led to the outcome of the proposal and of evaluating one or more vendors or partners that collaborated on the proposal;
uploading one or more documents used to develop or deliver the proposal to the data repositories; and
associating the data abstraction associated with the proposal opportunity with the received information and the uploaded documents.

8. The method of claim 7, wherein closing the proposal further includes:
receiving debriefing information that deconstructs the outcome of the proposal, wherein the debriefing information relates to one or more requirements associated with the proposal, how the entity responded to the one or more requirements, and how one or more competitors responded to the one or more requirements;
associating the data abstraction associated with the proposal opportunity with the debriefing information; and
storing the debriefing information relating to how the one or more competitors responded to the one or more requirements in a customer relationship management system associated communicatively coupled to the enterprise proposal management system.

9. The method of claim 1, wherein developing the proposal further includes:
receiving one or more inputs selecting of one or more templates to be used in creating a document associated with the proposal, wherein the one or more inputs further specify an order to use the one or more templates in the document associated with the proposal; and
merging the one or more templates according to the specified order to assemble the document associated with the proposal.

10. The method of claim 1, further comprising managing the data stored in the data repositories, wherein managing the data stored in the data repositories includes:
maintaining a proposal library that includes one or more active documents and one or more inactive documents, wherein the active documents have not been closed and the inactive documents have been closed for less than a first predetermined amount of time;
maintaining an archive library that includes one or more archived documents that have been closed for at least the first predetermined amount of time; and
displaying information relating to content that has expired or content that will expire within a second predetermined amount of time.

11. The method of claim 1, wherein controlling delivery of the proposal further includes:
handling a contract associated with the entity delivering the proposal using the enterprise proposal management system; and
displaying or updating information relating to at least one data abstraction associated with the contract, one or more documents associated with the contract, or one or more tasks associated with the contract.

12. The method of claim 11, wherein controlling delivery of the proposal further includes:
storing the information relating to the at least one data abstraction associated with the contract in the data repositories; and
associating the at least one data abstraction associated with the contract with the one or more documents and the one or more tasks associated with the contract.

13. The method of claim 11, wherein controlling delivery of the proposal further includes:
receiving one or more inputs selecting one or more templates to be used in creating a document associated with the contract, wherein the one or more inputs further specify an order to use the one or more templates in the document associated with the contract;
merging the one or more templates according to the specified order to assemble the document associated with the contract;
receiving information describing an outcome associated with the contract;
uploading the document associated with the contract and the one or more templates used to create the document associated with the contract to the data repositories; and
associating the data abstraction associated with the contract with the received information, the uploaded document associated with the contract, and the uploaded templates used to create the document associated with the contract.

14. The method of claim 1, further comprising:
storing a profile associated with an employee of the entity in the data repositories as a data abstraction associated with the employee, wherein the profile includes information describing the employee and a resume associated with the employee; and
associating the employee with a proxy to contact if the employee is unavailable.

15. The method of claim 1, further comprising:
storing information relating to a project associated with the entity in the data repositories as a data abstraction associated with the project;
receiving information describing an outcome associated with the project and one or more tasks associated with the project;
uploading one or more documents used to develop or the deliver the project to the data repositories; and
associating the data abstraction associated with the project with the received information and the one or more uploaded documents.

16. An enterprise proposal management system for managing proposal related tasks and proposal related data for an entity, wherein the proposal related tasks include one or more tasks for managing a proposal lifecycle, the system comprising:
one or more data repositories configured to store the proposal related data, wherein the proposal related data includes data derived from one or more of past, present, or anticipated proposal opportunities; and
one or more processors collectively configured to:
receive information describing a proposal opportunity that includes a solicitation for one or more bids at the enterprise proposal management system;
develop business strategies for the proposal opportunity using the data stored in the data repositories, wherein to develop the business strategies, the one or more processors are further configured to:
provide information relating to whether the entity should pursue the proposal opportunity;
store the information describing the proposal opportunity in the data repositories as a data abstraction associated with the proposal opportunity; and
generate a win theme associated with the proposal opportunity based on the information describing the proposal opportunity, wherein the win theme compares relative strengths associated with the entity and one or more competitors having abilities to respond to key issues associated with the proposal opportunity;
develop a proposal to be submitted in response to the solicitation if the entity pursues the proposal opportunity based on the developed business strategies, wherein to develop the proposal, the one or more processors are further configured to:
develop a bid amount or cost estimate associated with the entity delivering the proposal using the data stored in the data repositories, wherein the enterprise proposal management system launches a bidding process that displays one or more forms to develop the bid amount or cost estimate associated with the entity delivering the proposal; and
generate a score denoting a likelihood that the developed bid amount or cost estimate will result in the entity winning the proposal;
control delivery of the proposal if the entity wins the proposal, wherein to control delivery of the proposal, the one or more processors are further configured to interact with the data stored in the data repositories to coordinate one or more areas associated with the entity delivering the proposal; and automatically update the data abstraction stored in the data repositories to include information relating to one or more of the developed business strategies, the developed proposal, or the delivery of the proposal.

17. The system of claim 16, wherein the one or more processors are further configured to:
   receive a request relating to one or more of the proposal opportunity or the proposal at the enterprise proposal management system;
   communicate information relating to the request to a first service layer associated with the enterprise proposal management system, wherein the first service layer includes one or more services to manage the proposal related tasks and the proposal related data;
   communicate the information relating to the request from the first service layer to a second service layer associated with the enterprise proposal management system, wherein the second service layer includes at least one data service and at least one document service to manage the proposal related tasks and the proposal related data; and
   communicate the information relating to the request from the second service layer to the data repositories to automatically update the data stored in the data repositories to include the information relating to the request.

18. The system of claim 16, wherein the data repositories include at least one operational data repository and at least one data warehouse, wherein the data stored in the data repositories includes information relating to at least one of an enterprise resource planning system or a customer relationship management system associated with the entity.

19. The system of claim 18, wherein the data stored in the data repositories further includes one or more data abstractions having one or more metadata fields associated with one or more proposals, contracts, resumes, debriefings, projects, or documents.

20. The system of claim 16, wherein to develop the business strategies, the one or more processors are further configured to:
   update the data abstraction associated with the proposal opportunity to include the win theme.

21. The system of claim 20, wherein to develop the proposal, the one or more processors further configured to display or update information relating to at least one of the data abstraction associated with the proposal opportunity, one or more documents associated with developing the proposal, or one or more tasks associated with developing the proposal.

22. The system of claim 16, wherein the one or more processors are further configured to close the proposal based on an outcome of the proposal, wherein to close the proposal, the one or more processors are further configured to:
   receive information summarizing one or more issues that led to the outcome of the proposal and of evaluating one or more vendors or partners that collaborated on the proposal;
   upload one or more documents used to develop or deliver the proposal to the data repositories; and
   associate the data abstraction associated with the proposal opportunity with the received information and the uploaded documents.

23. The system of claim 22, wherein to close the proposal, the one or more processors are further configured to:
   receive debriefing information that deconstructs the outcome of the proposal, wherein the debriefing information relates to one or more requirements associated with the proposal, how the entity responded to the one or more requirements, and how one or more competitors responded to the one or more requirements;
   associate the data abstraction associated with the proposal opportunity with the debriefing information; and
   store the debriefing information relating to how the one or more competitors responded to the requirements in a customer relationship management system associated communicatively coupled to the enterprise proposal management system.

24. The system of claim 16, wherein to develop the proposal, the one or more processors further configured to:
   receive one or more inputs selecting one or more templates to be used in creating a document associated with the proposal, wherein the one or more inputs further specify an order to use the one or more templates in the document associated with the proposal; and
   merge the one or more templates according to the specified order to assemble the document associated with the proposal.

25. The system of claim 16, the one or more processors further configured to manage the data stored in the data repositories, wherein to manage the data stored in the data repositories, the one or more processors are further configured to:
   maintain a proposal library that includes one or more active documents and one or more inactive documents, wherein the active documents have not been closed and the inactive documents have been closed for less than a first predetermined amount of time;
   maintain an archive library that includes one or more archived documents that have been closed for at least the first predetermined amount of time; and
   display information relating to content that has expired or content that will expire within a second predetermined amount of time.

26. The system of claim 16, wherein to control delivery of the proposal, the one or more processors further configured to:
   handle a contract associated with the entity delivering the proposal; and
   display or update information relating to at least one data abstraction associated with the contract, one or more documents associated with the contract, or one or more tasks associated with the contract.

27. The system of claim 26, wherein to control delivery of the proposal, the one or more processors are further configured to:
   store the information relating to the at least one data abstraction associated with the contract in the data repositories; and
   associate the at least one data abstraction associated with the contract with the one or more documents and the one or more tasks associated with the contract.

28. The system of claim 26, wherein to control delivery of the proposal, the one or more processors are further configured to:
   receive one or more inputs selecting one or more templates to be used in creating a document associated with the contract, wherein the one or more inputs further specify an order to use the one or more templates in the document associated with the contract;
   merge the one or more templates according to the specified order to assemble the document associated with the contract;
   receive information describing an outcome associated with the contract;

upload the document associated with the contract and the one or more templates used to create the document associated with the contract to the data repositories; and associate the data abstraction associated with the contract with the received information, the uploaded document associated with the contract, and the uploaded templates used to create the document associated with the contract.

29. The system of claim 16, wherein the one or more processors are further configured to:

store a profile associated with an employee of the entity in the data repositories as a data abstraction associated with the employee, wherein the profile includes information describing the employee and a resume associated with the employee; and associate the employee with a proxy to contact if the employee is unavailable.

30. The system of claim 16, wherein the one or more processors are further configured to:

store information relating to a project associated with the entity in the data repositories as a data abstraction associated with the project;

receive information describing an outcome associated with the project and one or more tasks associated with the project;

upload one or more documents used to develop or the deliver the project to the data repositories; and associate the data abstraction associated with the project with the received information and the one or more uploaded documents.

* * * * *